United States Patent
Martinelli et al.

(10) Patent No.: US 12,469,546 B2
(45) Date of Patent: Nov. 11, 2025

(54) MEMORY ARRAY SEASONING

(71) Applicant: Micron Technology, Inc., Boise, ID (US)

(72) Inventors: Andrea Martinelli, Bergamo (IT); Claudia Palattella, Cologno Monzese (IT); Christophe Vincent Antoine Laurent, Agrate Brianza (IT); Ferdinando Bedeschi, Biassono (IT); Efrem Bolandrina, Fiorano al Serio (IT)

(73) Assignee: Micron Technology, Inc., Boise, ID (US)

( * ) Notice: Subject to any disclaimer, the term of this patent is extended or adjusted under 35 U.S.C. 154(b) by 183 days.

(21) Appl. No.: 18/196,268

(22) Filed: May 11, 2023

(65) Prior Publication Data
US 2023/0395136 A1    Dec. 7, 2023

Related U.S. Application Data

(60) Provisional application No. 63/348,317, filed on Jun. 2, 2022.

(51) Int. Cl.
| | |
|---|---|
| *G11C 11/4078* | (2006.01) |
| *G11C 11/4096* | (2006.01) |
| *G11C 11/4099* | (2006.01) |
| *G11C 5/02* | (2006.01) |
| *G11C 13/00* | (2006.01) |

(52) U.S. Cl.
CPC ...... *G11C 11/4096* (2013.01); *G11C 11/4078* (2013.01); *G11C 11/4099* (2013.01); *G11C 5/025* (2013.01); *G11C 13/0004* (2013.01); *G11C 13/0069* (2013.01)

(58) Field of Classification Search
CPC ........... G11C 11/4078; G11C 11/4096; G11C 11/4099; G11C 13/0004; G11C 13/0069; G11C 5/025
USPC ...................................................... 365/189.11
See application file for complete search history.

(56) References Cited

U.S. PATENT DOCUMENTS

| | | | |
|---|---|---|---|
| 8,897,076 B2 * | 11/2014 | Lee ......... | G11C 16/06 365/185.21 |
| 9,245,926 B2 | 1/2016 | Kau et al. | |
| 2004/0105316 A1 * | 6/2004 | Yang ....... | G11C 5/146 365/189.09 |
| 2021/0117500 A1 * | 4/2021 | Qin ......... | G11C 13/0028 |
| 2021/0398590 A1 * | 12/2021 | Sancon ..... | G11C 13/0028 |

* cited by examiner

*Primary Examiner* — Ly D Pham
(74) *Attorney, Agent, or Firm* — Holland & Hart LLP

(57) ABSTRACT

Methods, systems, and devices for memory array seasoning are described. Some memory cells may have an undesirably high threshold voltage and thus a seasoning operation may be performed on a target memory cell. To season the target memory cell, a bit line and a word line associated with the cell may be activated. Additionally or alternatively, a word line coupled with a second memory cell (e.g., a helper memory cell) that shares the activated bit line may be activated. Accordingly, current flowing across the target memory cell may be increased, which may reduce its threshold voltage.

13 Claims, 12 Drawing Sheets

SECTION A-A

▨ Unselected Memory Cell 105  ■ Selected Memory Cell 105-a

MEMORY ARRAY SEASONING

The present Application for Patent claims the benefit of U.S. Provisional Patent Application No. 63/348,317 by Martinelli et al., entitled "MEMORY ARRAY SEASONING," filed Jun. 2, 2022, which is assigned to the assignee hereof, and which is expressly incorporated by reference herein.

FIELD OF TECHNOLOGY

The following relates to one or more systems for memory, including memory array seasoning.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some cases, exposing a memory cell to high thermal environments (e.g., during fabrication) may cause a change in certain properties of the cell. For example, the threshold voltage of a memory cell may shift when exposed to relatively high temperatures. In some cases, the threshold voltage may become higher than the voltage levels used to access the memory cell during normal memory operations. As such, standard drivers of the memory array may not be able to provide for sufficient voltage levels to activate the memory cell. In some cases, a seasoning operation may be performed on memory cells prior to operation in order to adjust the cells' threshold voltages. As used herein, seasoning (e.g., a seasoning operation) may refer to the process of passing a relatively high current through a memory cell in order to affect its threshold voltage. However, some memory arrays may not provide for sufficient current to reliably season a memory cell using the standard drivers of the memory array. Accordingly, it may be desirable to use additional techniques to pass relatively higher currents through a memory cell to alter its threshold voltage prior to operation.

A method and apparatus configured to pass relatively high currents through a memory cell to alter its threshold voltage prior to operation is described herein. In order to alter a threshold voltage of a memory cell (e.g., a target memory cell), one or more additional memory cells (e.g., one or more helper memory cells) may be utilized. For example, the helper cell and target cell may share an access line such that, when both are activated, the helper cell provides additional current across the target cell. That is, the use of a helper cell may provide additional current across a target cell, which may effectively set the threshold voltage of the target cell prior to operation. In some cases, multiple helper cells may be used to season a target cell and, additionally or alternatively, multiple target cells may be seasoned at a time. Accordingly, utilizing a helper cell during a seasoning operation may effectively set the threshold voltage of target cells, which may increase reliability of the associated memory array without additional circuitry.

Features of the disclosure are initially described in the context of memory devices and arrays with reference to FIGS. 1, 2, 3A, and 3B. Features of the disclosure are described in the context memory array seasoning in two dimensional and three dimension memory configurations with reference to FIGS. 4-9. These and other features of the disclosure are further illustrated by and described with reference to flow charts that relate to memory array seasoning as described with reference to FIGS. 10-12.

Figure 1:
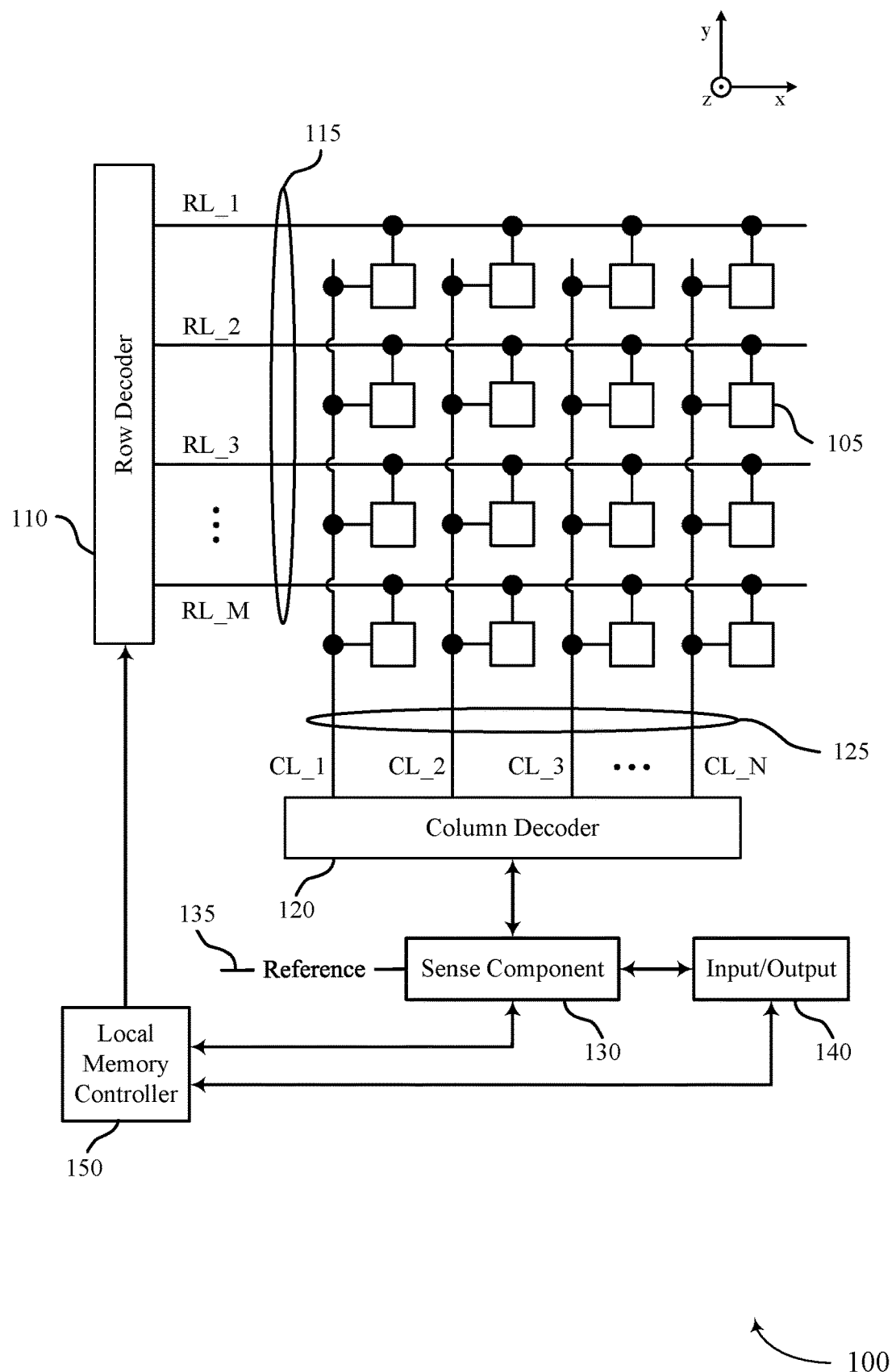
FIG. 1 illustrates an example of a memory array that supports memory array seasoning in accordance with examples as disclosed herein.

FIG. 1 illustrates an example of a memory device 100 that supports memory array seasoning in accordance with examples as disclosed herein. In some examples, the memory device 100 may be referred to as or include a memory die, a memory chip, or an electronic memory apparatus. The memory device 100 may be operable to provide locations to store information (e.g., physical memory addresses) that may be used by a system (e.g., a host device coupled with the memory device 100, for writing information, for reading information).

The memory device 100 may include one or more memory cells 105 that each may be programmable to store different logic states (e.g., a programmed one of a set of two or more possible states). For example, a memory cell 105 may be operable to store one bit of information at a time (e.g., a logic 0 or a logic 1). In some examples, a memory cell 105 (e.g., a multi-level memory cell 105) may be operable to store more than one bit of information at a time (e.g., a logic 00, logic 01, logic 10, a logic 11). In some examples, the memory cells 105 may be arranged in an array.

A memory cell 105 may store a logic state using a configurable material, which may be referred to as a memory element, a storage element, a memory storage element, a material element, a material memory element, a material portion, or a polarity-written material portion, among others. A configurable material of a memory cell 105 may refer to a chalcogenide-based storage component. For example, a chalcogenide storage element may be used in a phase change memory cell, a thresholding memory cell, or a self-selecting memory cell, among other architectures.

In some examples, the material of a memory cell 105 may include a chalcogenide material or other alloy including selenium (Se), tellurium (Te), arsenic (As), antimony (Sb), carbon (C), germanium (Ge), silicon (Si), or indium (IN), or various combinations thereof. In some examples, a chalcogenide material having primarily selenium (Se), arsenic (As), and germanium (Ge) may be referred to as a SAG-alloy. In some examples, a SAG-alloy may also include silicon (Si) and such chalcogenide material may be referred to as SiSAG-alloy. In some examples, SAG-alloy may include silicon (Si) or indium (In) or a combination thereof and such chalcogenide materials may be referred to as SiSAG-alloy or InSAG-alloy, respectively, or a combination thereof. In some examples, the chalcogenide material may include additional elements such as hydrogen (H), oxygen (O), nitrogen (N), chlorine (Cl), or fluorine (F), each in atomic or molecular forms.

In some examples, a memory cell 105 may be an example of a phase change memory cell. In such examples, the material used in the memory cell 105 may be based on an alloy (such as the alloys listed above) and may be operated so as to change to different physical state (e.g., undergo a phase change) during normal operation of the memory cell 105. For example, a phase change memory cell 105 may be associated with a relatively disordered atomic configuration (e.g., a relatively amorphous state) and a relatively ordered atomic configuration (e.g., a relatively crystalline state). A relatively disordered atomic configuration may correspond to a first logic state (e.g., a RESET state, a logic 0) and a relatively ordered atomic configuration may correspond to a second logic state (e.g., a logic state different than the first logic state, a SET state, a logic 1).

In some examples (e.g., for thresholding memory cells 105, for self-selecting memory cells 105), some or all of the set of logic states supported by the memory cells 105 may be associated with a relatively disordered atomic configuration of a chalcogenide material (e.g., the material in an amorphous state may be operable to store different logic states). In some examples, the storage element of a memory cell 105 may be an example of a self-selecting storage element. In such examples, the material used in the memory cell 105 may be based on an alloy (e.g., such as the alloys listed above) and may be operated so as to undergo a change to a different physical state during normal operation of the memory cell 105. For example, a self-selecting or thresholding memory cell 105 may have a high threshold voltage state and a low threshold voltage state. A high threshold voltage state may correspond to a first logic state (e.g., a RESET state, a logic 0) and a low threshold voltage state may correspond to a second logic state (e.g., a logic state different than the first logic state, a SET state, a logic 1).

During a write operation (e.g., a programming operation) of a self-selecting or thresholding memory cell 105, a polarity used for a write operation may influence (e.g., determine, set, program) a behavior or characteristic of the material of the memory cell 105, such as a thresholding characteristic (e.g., a threshold voltage) of the material. A difference between thresholding characteristics of the material of the memory cell 105 for different logic states stored by the material of the memory cell 105 (e.g., a difference between threshold voltages when the material is storing a logic state '0' versus a logic state '1') may correspond to the read window of the memory cell 105.

The memory device 100 may include access lines (e.g., row lines 115 each extending along an illustrative x-direction, column lines 125 each extending along an illustrative y-direction) arranged in a pattern, such as a grid-like pattern. Access lines may be formed with one or more conductive materials. In some examples, row lines 115, or some portion thereof, may be referred to as word lines. In some examples, column lines 125, or some portion thereof, may be referred to as digit lines or bit lines. References to access lines, or their analogues, are interchangeable without loss of understanding. Memory cells 105 may be positioned at intersections of access lines, such as row lines 115 and the column lines 125. In some examples, memory cells 105 may also be arranged (e.g., addressed) along an illustrative z-direction, such as in an implementation of sets of memory cells 105 being located at different levels (e.g., layers, decks, planes, tiers) along the illustrative z-direction. In some examples, a memory device 100 that includes memory cells 105 at different levels may be supported by a different configuration of access lines, decoders, and other supporting circuitry than shown.

Operations such as read operations and write operations may be performed on the memory cells 105 by activating access lines such as one or more of a row line 115 or a column line 125, among other access lines associated with alternative configurations. For example, by activating a row line 115 and a column line 125 (e.g., applying a voltage to the row line 115 or the column line 125), a memory cell 105 may be accessed in accordance with their intersection. An intersection of a row line 115 and a column line 125, among other access lines, in various two-dimensional or three-dimensional configuration may be referred to as an address of a memory cell 105. In some examples, an access line may be a conductive line coupled with a memory cell 105 and may be used to perform access operations on the memory cell 105. In some examples, the memory device 100 may perform operations responsive to commands, which may be issued by a host device coupled with the memory device 100 or may be generated by the memory device 100 (e.g., by a local memory controller 150).

Accessing the memory cells 105 may be controlled through one or more decoders, such as a row decoder 110 or a column decoder 120, among other examples. For example, a row decoder 110 may receive a row address from the local memory controller 150 and activate a row line 115 based on the received row address. A column decoder 120 may receive a column address from the local memory controller 150 and may activate a column line 125 based on the received column address.

The sense component 130 may be operable to detect a state (e.g., a material state, a resistance state, a threshold state) of a memory cell 105 and determine a logic state of the memory cell 105 based on the detected state. The sense component 130 may include one or more sense amplifiers to convert (e.g., amplify) a signal resulting from accessing the memory cell 105 (e.g., a signal of a column line 125 or other access line). The sense component 130 may compare a signal detected from the memory cell 105 to a reference 135 (e.g., a reference voltage, a reference charge, a reference current). The detected logic state of the memory cell 105 may be provided as an output of the sense component 130 (e.g., to an input/output component 140), and may indicate the detected logic state to another component of the memory device 100 or to a host device coupled with the memory device 100.

The local memory controller 150 may control the accessing of memory cells 105 through the various components (e.g., a row decoder 110, a column decoder 120, a sense component 130, among other components). In some examples, one or more of a row decoder 110, a column decoder 120, and a sense component 130 may be co-located with the local memory controller 150. The local memory controller 150 may be operable to receive information (e.g., commands, data) from one or more different controllers (e.g., an external memory controller associated with a host device, another controller associated with the memory device 100), translate the information into a signaling that can be used by the memory device 100, perform one or more operations on the memory cells 105 and communicate data from the memory device 100 to a host device based on performing the one or more operations. The local memory controller 150 may generate row address signals and column address signals to activate access lines such as a target row line 115 and a target column line 125. The local memory controller 150 also may generate and control various signals (e.g., voltages, currents) used during the operation of the memory device 100. In general, the amplitude, the shape, or the duration of an applied signal discussed herein may be varied and may be different for the various operations discussed in operating the memory device 100.

The local memory controller 150 may be operable to perform one or more access operations on one or more memory cells 105 of the memory device 100. Examples of access operations may include a write operation, a read operation, a refresh operation, a precharge operation, or an activate operation, among others. In some examples, access operations may be performed by or otherwise coordinated by the local memory controller 150 in response to access commands (e.g., from a host device). The local memory controller 150 may be operable to perform other access operations not listed here or other operations related to the operating of the memory device 100 that are not directly related to accessing the memory cells 105.

The memory device 100 may include any quantity of non-transitory computer readable media that support memory array seasoning. For example, a local memory controller 150, a row decoder 110, a column decoder 120, a sense component 130, or an input/output component 140, or any combination thereof may include or may access one or more non-transitory computer readable media storing instructions (e.g., firmware) for performing the functions ascribed herein to the memory device 100. For example, such instructions, if executed by the memory device 100, may cause the memory device 100 to perform one or more associated functions as described herein.

In some examples, a seasoning operation may be performed on one or more memory cells 105 of the memory device 100 prior to operation (e.g., prior to access operations being performed on the memory cells 105). As described herein, a seasoning operation may be performed on one or more target memory cells 105 using one or more helper memory cells 105. For example, a target memory cell 105 and a helper memory cell may share a same column line 125 and may each be coupled with a different row line 115. Accordingly, to season a target memory cell 105, the row line 115 and the column line 125 associated with the target memory cell 105 may be selected.

After selecting the target row line 115 and the target column line 125, the row line 115 coupled with the helper memory cell 105 may be selected. By selecting the helper memory cell 105, a relatively high current may be passed through the target memory cell 105, which may affect its threshold voltage. That is, the threshold voltage of the target memory cell 105 may have shifted during fabrication or prior to operation, thus seasoning the target memory cell 105 may alter its threshold voltage so that it may be reliably accessed.

Figure 2:
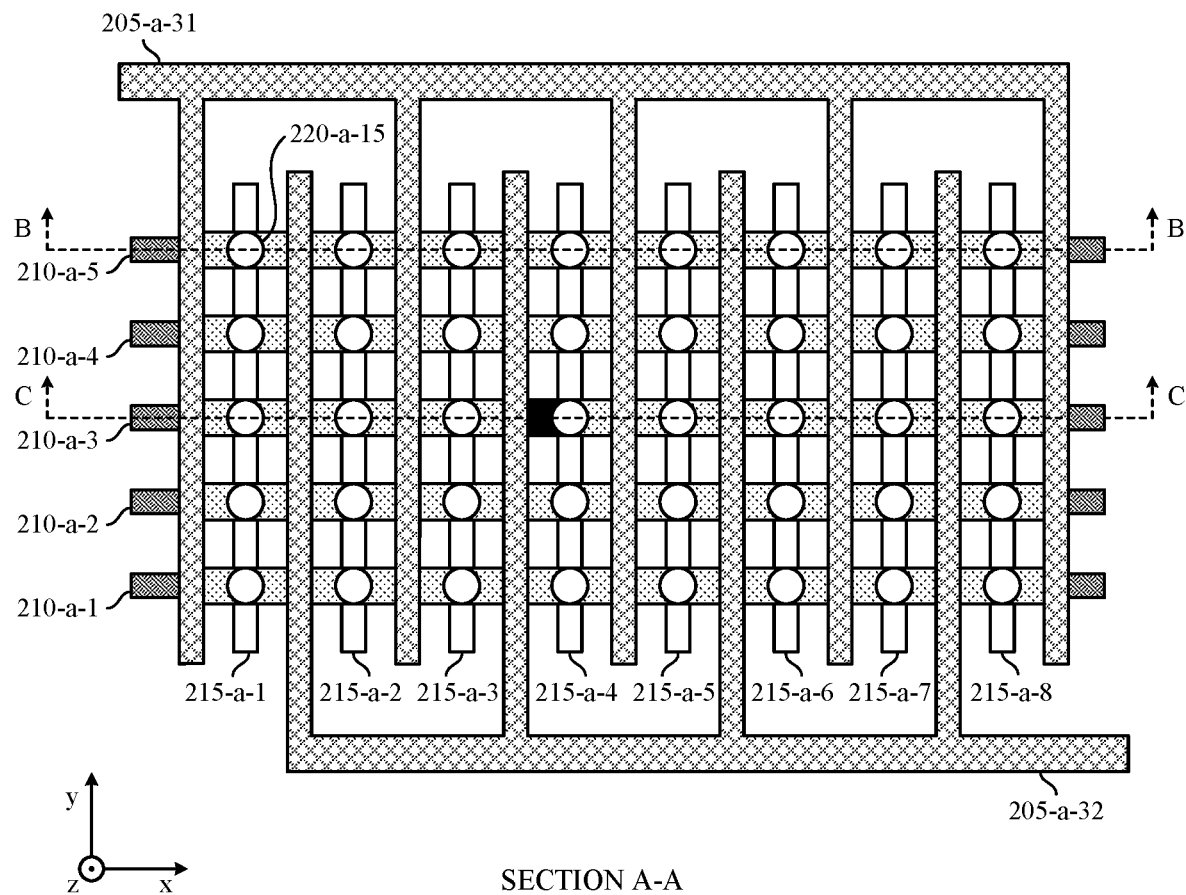
FIG. 2 illustrates a top view of an example of a memory array that supports memory array seasoning in accordance with examples as disclosed herein.
Figure 3A:
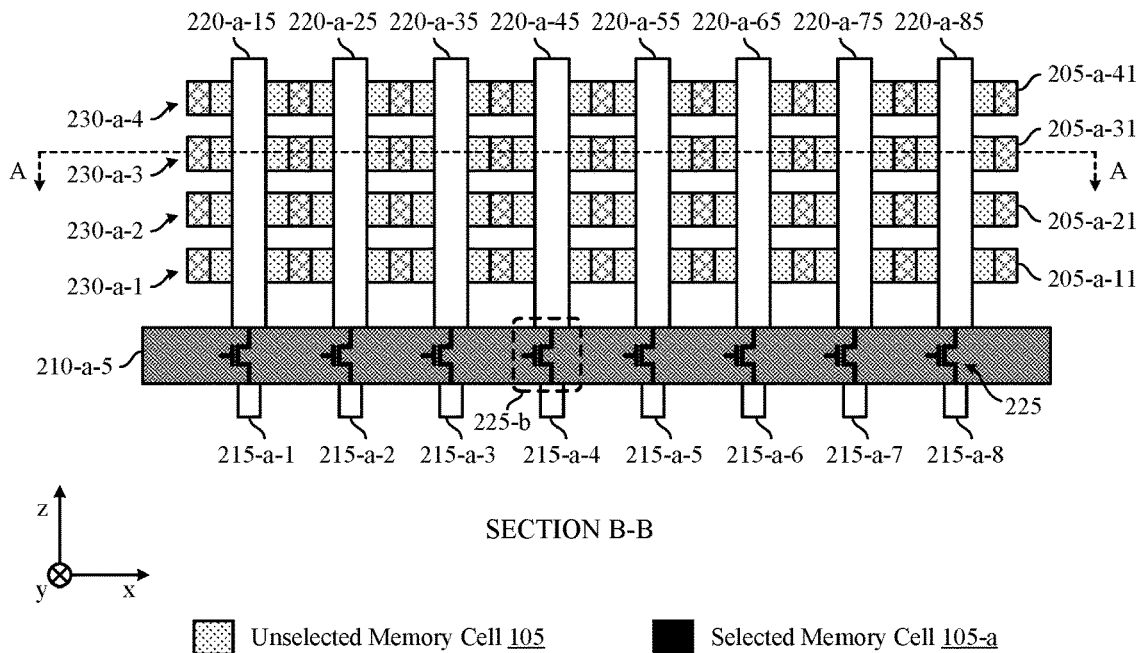
FIGS. 3A and 3B illustrate side views of an example of a memory array that supports memory array seasoning in accordance with examples as disclosed herein.
Figure 3B:
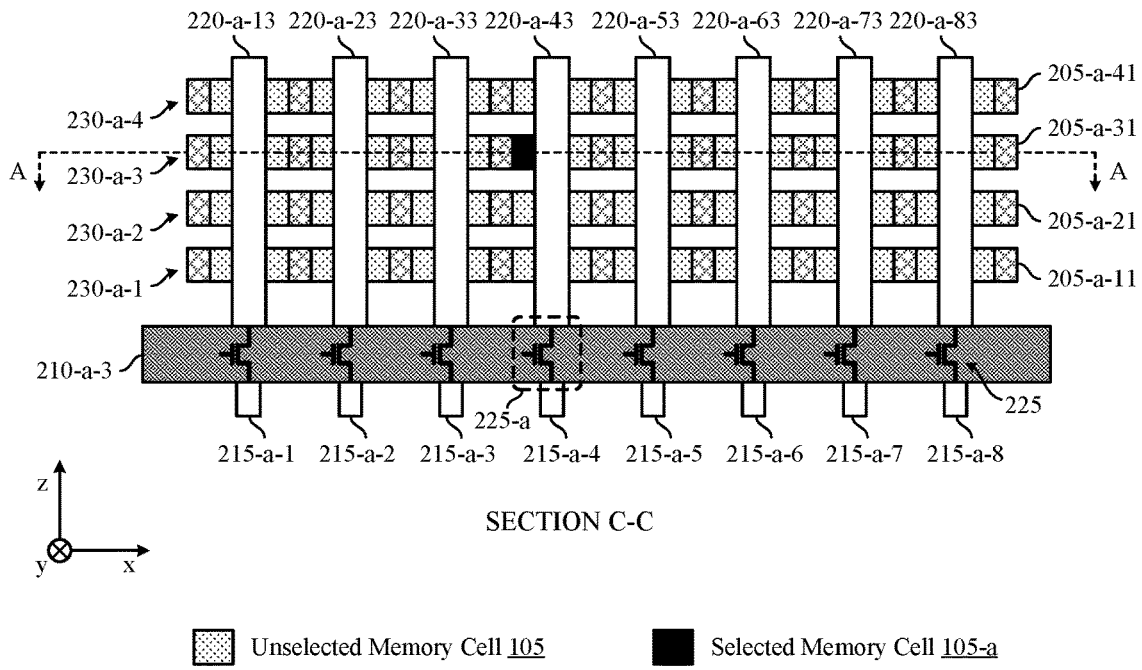

FIGS. 2, 3A, and 3B illustrate an example of a memory array 200 that supports memory array seasoning in accordance with examples as disclosed herein. The memory array 200 may be included in a memory device 100, and illustrates an example of a three-dimensional arrangement of memory cells 105 that may be accessed by various conductive structures (e.g., access lines). FIG. 2 illustrates a top section view (e.g., SECTION A-A) of the memory array 200 relative to a cut plane A-A as shown in FIGS. 3A and 3B. FIG. 3A illustrates a side section view (e.g., SECTION B-B) of the memory array 200 relative to a cut plane B-B as shown in FIG. 2. FIG. 3B illustrates a side section view (e.g., SECTION C-C) of the memory array 200 relative to a cut plane C-C as shown in FIG. 2. The section views may be examples of cross-sectional views of the memory array 200 with some aspects (e.g., dielectric structures) removed for clarity. Elements of the memory array 200 may be described relative to an x-direction, a y-direction, and a z-direction, as illustrated in each of FIGS. 2, 3A, and 3B. Although some elements included in FIGS. 2, 3A, and 3B are labeled with a numeric indicator, other corresponding elements are not labeled, although they are the same or would be understood to be similar, in an effort to increase visibility and clarity of the depicted features. Further, although some quantities of repeated elements are shown in the illustrative example of memory array 200, techniques in accordance with examples as described herein may be applicable to any quantity of such elements, or ratios of quantities between one repeated element and another.

In the example of memory array 200, memory cells 105 and word lines 205 may be distributed along the z-direction according to levels 230 (e.g., decks, layers, planes, tiers, as illustrated in FIGS. 3A and 3B). In some examples, the z-direction may be orthogonal to a substrate (not shown) of the memory array 200, which may be below the illustrated structures along the z-direction. Although the illustrative example of memory array 200 includes four levels 230, a memory array 200 in accordance with examples as disclosed herein may include any quantity of one or more levels 230 (e.g., 64 levels, 128 levels) along the z-direction.

Each word line 205 may be an example of a portion of an access line that is formed by one or more conductive materials (e.g., one or more metal portions, one or more metal alloy portions). As illustrated, a word line 205 may be formed in a comb structure, including portions (e.g., projections, tines) extending along the y-direction through gaps (e.g., alternating gaps) between pillars 220. For example, as illustrated, the memory array 200, may include two word lines 205 per level 230 (e.g., according to odd word lines 205-a-n1 and even word lines 205-a-n2 for a given level, n), where such word lines 205 of the same level 230 may be described as being interleaved (e.g., with portions of an odd word line 205-a-n1 projecting along the y-direction between portions of an even word line 205-a-n2, and vice versa). In some examples, an odd word line 205 (e.g., of a level 230) may be associated with a first memory cell 105 on a first side (e.g., along the x-direction) of a given pillar 220 and an even word line (e.g., of the same level 230) may be associated with a second memory cell 105 on a second side (e.g., along the x-direction, opposite the first memory cell 105) of the given pillar 220. Thus, in some examples, memory cells 105 of a given level 230 may be addressed (e.g., selected, activated) in accordance with an even word line 205 or an odd word line 205.

Each pillar 220 may be an example of a portion of an access line (e.g., a conductive pillar portion) that is formed by one or more conductive materials (e.g., one or more metal portions, one or more metal alloy portions). As illustrated, the pillars 220 may be arranged in a two-dimensional array (e.g., in an xy-plane) having a first quantity of pillars 220 along a first direction (e.g., eight pillars along the x-direction, eight rows of pillars), and having a second quantity of pillars 220 along a second direction (e.g., five pillars along the y-direction, five columns of pillars). Although the illustrative example of memory array 200 includes a two-dimensional arrangement of eight pillars 220 along the x-direction and five pillars 220 along the y-direction, a memory array 200 in accordance with examples as disclosed herein may include any quantity of pillars 220 along the x-direction and any quantity of pillars 220 along the y-direction. Further, as illustrated, each pillar 220 may be coupled with a respective set of memory cells 105 (e.g., along the z-direction, one or more memory cells 105 for each level 230). A pillar 220 may have a cross-sectional area in an xy-plane that extends along the z-direction. Although illustrated with a circular cross-sectional area in the xy-plane, a pillar 220 may be formed with a different shape, such as having an elliptical, square, rectangular, polygonal, or other cross-sectional area in an xy-plane.

The memory cells 105 each may include a chalcogenide material. In some examples, the memory cells 105 may be examples of thresholding memory cells. Each memory cell 105 may be accessed (e.g., addressed, selected) according to an intersection between a word line 205 (e.g., a level selection, which may include an even or odd selection within a level 230) and a pillar 220. For example, as illustrated, a selected memory cell 105-a of the level 230-a-3 may be accessed according to an intersection between the pillar 220-a-43 and the word line 205-a-32.

A memory cell 105 may be accessed (e.g., written to, read from) by applying an access bias (e.g., an access voltage, $V_{access}$, which may be a positive voltage or a negative voltage) across the memory cell 105. In some examples, an access bias may be applied by biasing a selected word line 205 with a first voltage (e.g., $V_{access}/2$) and by biasing a selected pillar 220 with a second voltage (e.g., $-V_{access}/2$), which may have an opposite sign relative to the first voltage.

Regarding the selected memory cell 105-a, a corresponding access bias (e.g., the first voltage) may be applied to the word line 205-a-32, while other unselected word lines 205 may be grounded (e.g., biased to 0V). In some examples, a word line bias may be provided by a word line driver (not shown) coupled with one or more of the word lines 205.

To apply a corresponding access bias (e.g., the second voltage) to a pillar 220, the pillars 220 may be configured to be selectively coupled with a sense line 215 (e.g., a digit line, a column line, an access line extending along the y-direction) via a respective transistor 225 coupled between (e.g., physically, electrically) the pillar 220 and the sense line 215. In some examples, the transistors 225 may be vertical transistors (e.g., transistors having a channel along the z-direction, transistors having a semiconductor junction along the z-direction), which may be formed above the substrate of the memory array 200 using various techniques (e.g., thin film techniques). In some examples, a selected pillar 220, a selected sense line 215, or a combination thereof may be an example of a selected column line 125 described with reference to FIG. 1 (e.g., a bit line).

The transistors 225 (e.g., a channel portion of the transistors 225) may be activated by gate lines 210 (e.g., activation lines, selection lines, a row line, an access line extending along the x-direction) coupled with respective gates of a set of the transistors 225 (e.g., a set along the x-direction). In other words, each of the pillars 220 may have a first end (e.g., towards the negative z-direction, a bottom end) configured for coupling with an access line (e.g., a sense line 215). In some examples, the gate lines 210, the transistors 225, or both may be considered to be components of a row decoder 110 (e.g., as pillar decoder components). In some examples, the selection of (e.g., biasing of) pillars 220, or sense lines 215, or various combinations thereof, may be supported by a column decoder 120, or a sense component 130, or both.

To apply the corresponding access bias (e.g., $-V_{access}/2$) to the pillar 220-a-43, the sense line 215-a-4 may be biased with the access bias, and the gate line 210-a-3 may be grounded (e.g., biased to 0V) or otherwise biased with an activation voltage. In an example where the transistors 225 are n-type transistors, the gate line 210-a-3 being biased with a voltage that is relatively higher than the sense line 215-a-4 may activate the transistor 225-a (e.g., cause the transistor 225-a to operate in a conducting state), thereby coupling the pillar 220-a-43 with the sense line 215-a-4 and biasing the pillar 220-a-43 with the associated access bias. However, the transistors 225 may include different channel types, or may be operated in accordance with different biasing schemes, to support various access operations.

In some examples, unselected pillars 220 of the memory array 200 may be electrically floating when the transistor 225-a is activated, or may be coupled with another voltage source (e.g., grounded, via a high-resistance path, via a leakage path) to avoid a voltage drift of the pillars 220. For example, a ground voltage being applied to the gate line 210-a-3 may not activate other transistors coupled with the gate line 210-a-3, because the ground voltage of the gate line 210-a-3 may not be greater than the voltage of the other sense lines 215 (e.g., which may be biased with a ground voltage or may be floating). Further, other unselected gate lines 210, including gate line 210-a-5 as shown in FIG. 3A, may be biased with a voltage equal to or similar to an access bias (e.g., $-V_{access}/2$, or some other negative bias or bias relatively near the access bias voltage), such that transistors 225 along an unselected gate line 210 are not activated. Thus, the transistor 225-b coupled with the gate line 210-a-5 may be deactivated (e.g., operating in a non-conductive state), thereby isolating the voltage of the sense line 215-a-4 from the pillar 220-a-45, among other pillars 220.

In a write operation, a memory cell 105 may be written to by applying a write bias (e.g., where $V_{access}=V_{write}$, which may be a positive voltage or a negative voltage) across the memory cell 105. In some examples, a polarity of a write bias may influence (e.g., determine, set, program) a behavior or characteristic of the material of the memory cell 105, such as the threshold voltage of the material. For example, applying a write bias with a first polarity may set the material of the memory cell 105 with a first threshold voltage, which may be associated with storing a logic 0. Further, applying a write bias with a second polarity (e.g., opposite the first polarity) may set the material of the memory cell with a second threshold voltage, which may be associated with storing a logic 1. A difference between threshold voltages of the material of the memory cell 105 for different logic states stored by the material of the memory cell 105 (e.g., a difference between threshold voltages when the material is storing a logic state '0' versus a logic state '1') may correspond to the read window of the memory cell 105.

In a read operation, a memory cell 105 may be read from by applying a read bias (e.g., where $V_{access}=V_{read}$, which may be a positive voltage or a negative voltage) across the memory cell 105. In some examples, a logic state of the memory cell 105 may be evaluated based on whether the memory cell 105 thresholds in the presence of the applied read bias. For example, such a read bias may cause a memory cell 105 storing a first logic state (e.g., a logic 0) to threshold (e.g., permit a current flow, permit a current above a threshold current), and may not cause a memory cell 105 storing a second logic state (e.g., a logic 1) to threshold (e.g., may not permit a current flow, may permit a current below a threshold current).

In some examples, a seasoning operation may be performed on one or more memory cells 105 of the memory array 200 prior to operation (e.g., prior to access operations being performed on the memory cells 105). As described herein, a seasoning operation may be performed on one or more target memory cells 105 using one or more helper memory cells 105. For example, a target memory cell 105 and a helper memory cell may be coupled with a same pillar 220 and may each be coupled with a different word line 205. Accordingly, to season a target memory cell 105, the word line 205 and pillar 220 associated with the target memory cell 105 may be selected.

After selecting the target word line 205 and the shared pillar 220, the word line 205 coupled with the helper memory cell 105 may be selected. By selecting the helper memory cell 105, a relatively high current may be passed through the target memory cell 105, which may affect its threshold voltage. That is, the threshold voltage of the target memory cell 105 may have shifted during fabrication or prior to operation, thus seasoning the target memory cell 105 may alter its threshold voltage so that it may be reliably accessed.

Figure 4:
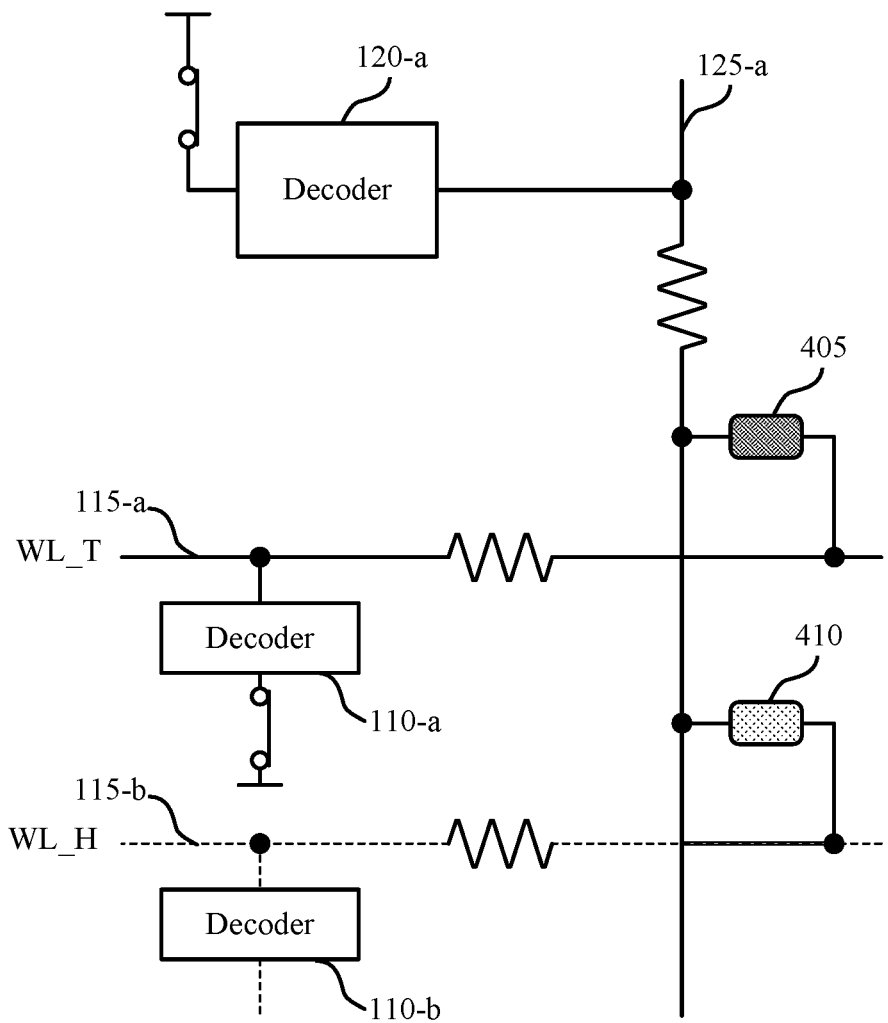
FIG. 4 illustrates an example of a circuit that supports memory array seasoning in accordance with examples as disclosed herein.

FIG. 4 illustrates an example of a circuit 400 that supports memory array seasoning in accordance with examples as disclosed herein. The circuit 400 may be an example of an aspect or aspects of the memory device 100 and may include word lines 115-a and 115-b, and a bit line 125-a which may be examples of row lines 115 and column lines 125 as described in FIG. 1. The word line 115-a and bit line 125-a may be selected to access a target cell 405, and the word line 115-b and bit line 125-a may be selected to access a helper cell 410. A decoder 120-a, which may be an example column decoder 120 as described in FIG. 1, may select the bit line 125-a. Similarly, a decoder 110-a and a decoder 110-b may select word line 115-a and word line 115-b respectively.

In some cases, during fabrication of the associated memory array, the threshold voltage of one or more memory cells may shift to an undesirably high voltage such that the drivers of the circuit 400 may not provide an adequate drive strength to reliably access the memory cells. Accordingly, one or more memory cells may be seasoned prior to use in order to effectively lower the threshold voltage of the respective memory cell. By lowering the cells' threshold voltage, the drivers of the circuit 400 may provide an adequate drive strength to reliably access the memory cells.

In some examples, a seasoning operation may be performed on the target cell 405, using a helper cell 410, to lower the threshold voltage of the target cell 405. As used herein, a seasoning operation may refer to the process of altering a target memory cell's threshold voltage by passing a relatively high current through the cell. For example, the memory cell 405 may be stressed by a relatively high thermal budget (e.g., during fabrication) such that the threshold voltage to activate the memory cell 405 may be higher than the operating voltages used in some applications. As such, the memory cell 405 may not be reliably accessed during operation, and thus may first be seasoned prior to operation.

A seasoning operation may thus be performed on the target memory cell 405 to alter its threshold voltage to be within the operating voltage level of the associated memory array. In some cases, a seasoning operation may include passing relatively high levels of current through the memory cell 405. The level of current used to alter the threshold voltage of the memory cell 405 may be higher than the current levels used in normal memory operations. For example, the maximum current available to the target cell 405 may be limited by the bypass of the rail-to-rail supplies at the decoders 120-a and 110-a. In some cases, the voltage drop across the decoders 120-a and 110-a may be large enough that the current at the target cell 405 may not be sufficient to season the target cell 405.

Thus, the current across the target cell 405 may be increased by using the helper cell 410. As used herein, a helper cell may refer to one or more memory cells used to increase current passed through the target cell 405. In some cases, the helper cell 410 may not be used for normal memory operations, and may instead be associated with a dummy tier or a dummy word line. Moreover, the helper cell 410 share an access line (e.g., a digit line in a 2D configuration) or a pillar (e.g., a conductive pillar in a 3D configuration) and may experience a low voltage drop when activated, thus generating additional current to flow to the target cell 405.

For example, the drivers of the target cell 405 may activate the target cell 405 by applying a first voltage to a first access line (e.g., word line 115-a) and a second voltage to a second access (e.g., bit line 125-a) which may cause a current to flow across the target cell 405. The helper cell 410 may share the second access line (e.g., bit line 125-a) with the target cell 405. The drivers of the helper cell 410 may apply a voltage to a third access line (e.g., word line 115-b) which may cause a current to flow across the helper cell 410. Upon selecting the helper cell 410, the current across the target cell 405 may be increased, which may lower its threshold voltage.

Although illustrated in a 2D configuration, seasoning operations may be performed on 2D or 3D memory arrays.

For example, in vertically accessed 3D configurations (e.g., memory cells arranged in tiers with a vertical pillar coupled to memory cells in different tiers) a thin-film transistor (TFT) selector driven by a dedicated array line (e.g., gate line) may have a low current drive capability, which may limit the current available for seasoning. Thus, it may be desirable to provide extra current for a target cell using minimal extra circuitry in order to effectively lower the threshold voltage of a target cell.

Additionally or alternatively, a helper cell 410 may be associated with a dummy access line or a dummy tier. For example, in a vertically accessed 3D configuration, the helper cell 410 may be configured on a dummy tier that shares a pillar with the target cell 405. Memory cells located in a dummy tier may not be used for ordinary access operations (e.g., the memory cells may not store data associated with a host device), and may instead be used only for seasoning operations. Additionally or alternatively, multiple helper cells may be used to season one or more target cells.

In other examples, a helper cell 410 may be associated with a dummy word line 115-*b* having a dedicated decoder 110-*b* (e.g., in a 2D configuration). The dummy word line 115-*b* may include a dedicated decoder 110-*b* to select the helper cell 410. Since the decoder 110-*b* may select a single array line (e.g., dedicated to accessing the helper cell 410) and thus may not be used in normal memory operations, the decoder 110-*b* may be configured with larger drive strength (e.g., relative to decoder 120-*a* and 110-*a*) and optimized for a relatively low voltage drop. Similarly, the resistance of the dummy word line 115-*b* may also be optimized for generating a relatively high current at the helper cell 410 (e.g., configured with a lower resistance). Accordingly, one or more memory cells may be seasoned prior to use in order to effectively lower the threshold voltage of the respective memory cell. By lowering the cells' threshold voltage, the drivers of the circuit 400 may provide an adequate drive strength to reliably access the memory cells.

Figure 5A:
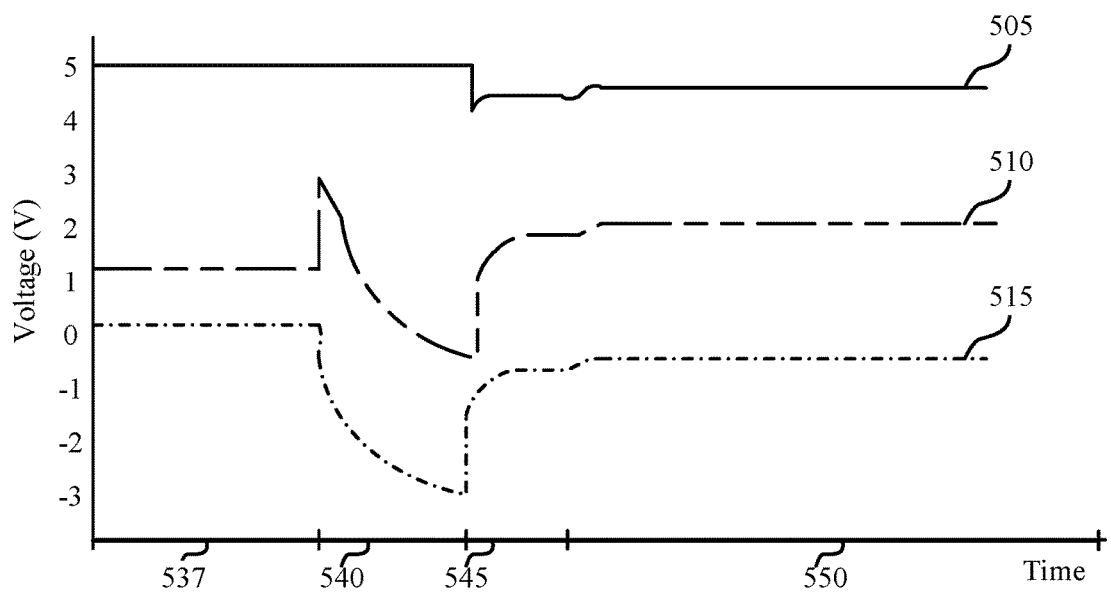
FIGS. 5A and 5B illustrate example timing diagrams that support memory array seasoning in accordance with examples as disclosed herein.
Figure 5B:
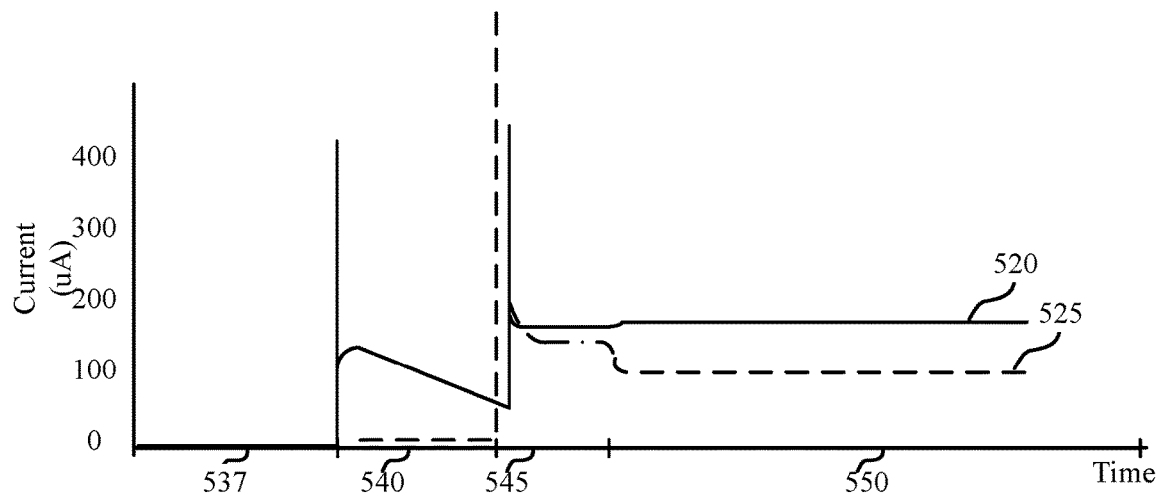

FIGS. 5A and 5B illustrate timing diagrams 500-*a* and 500-*b* that support memory array seasoning in accordance with examples as disclosed herein. The timing diagram 500-*a* may illustrate voltages at one or more nodes of the circuit 400 as described with reference to FIG. 4. That is, the timing diagram 500-*a* may illustrate a voltage 505 of a helper word line 115-*b*, a voltage 510 of a bit line 125-*a*, and a voltage 515 of a target word line 115-*a*. Utilizing a helper cell associated with the helper word line 115-*b* to season a target cell may increase a current across the target cell, which may effectively lower its threshold voltage so that it may be reliably accessed. The timing diagram 500-*b* may illustrate currents through one or more devices of the circuit 400 as described with reference to FIG. 4. For example, the timing diagram 500-*b* may illustrate a current 520 of a target memory cell 405 and a current 525 of a helper memory cell 410. Utilizing a helper cell associated with the helper word line 115-*b* to season a target cell may increase a current across the target cell 405, which may effectively lower its threshold voltage so that it may be reliably accessed.

During the time interval 537, voltage sources associated with the helper word line 115-*b*, the target word line 115-*a*, and the bit line 125-*a* may be activated. The target memory cell 405 and the helper memory cell 410 may not be selected at this time, and thus no current may be applied across the cells. During the time interval 540, the decoders 120-*a*, 110-*a*, and 110-*b* may be activated, thereby selecting the bit line 125-*a*, the word line 115-*a*, and the word line 115-*b*. Accordingly, during the time interval 540, the voltages of the bit line 125-*a*, the word line 115-*a*, and the word line 115-*b* may drop. For example, the voltage drop of the word line 115-*a* may create a differential across the target cell 405 which allows a relatively high current to flow across the target cell 405. In some cases, the driver of the target cell 405 may apply a current limit to the bit line 125-*a*. Limiting the current on the bit line 125-*a* may allow the voltage on the bit line 125-*a* to drop, thereby creating a higher potential across the helper cell 410 which may facilitate switching on of the helper cell 410. During the time interval 545, the driver of the target cell 405 may remove the current limit on the bit line 125-*a* so a higher current may flow through the target cell 405 sourced by the bit line 125-*a* and the helper cell 410. The voltages of the bit line 125-*a*, the word line 115-*a*, and the word line 115-*b* may increase to a constant (or a relatively constant) voltage and may remain at or near such values during the time interval 550. Similarly, the current across the target memory cell 405 and the helper memory cell 410 may decrease to a constant (or relatively constant) current and may remain at or near such values during the time interval 550. As shown in FIG. 5B, a current across the target memory cell 405 may be greater than a current across the helper memory cell 410 due to the current sourced from the decoder 120-*a* for the bit line 125-*a*. In addition, the current across the target memory cell 405 may be greater than a current drive capability of the decoder 120-*a* for the bit line 125-*a*. Performing seasoning of the target cell 405 may effectively reduce the threshold voltage of the target cell 405.

Figure 6:
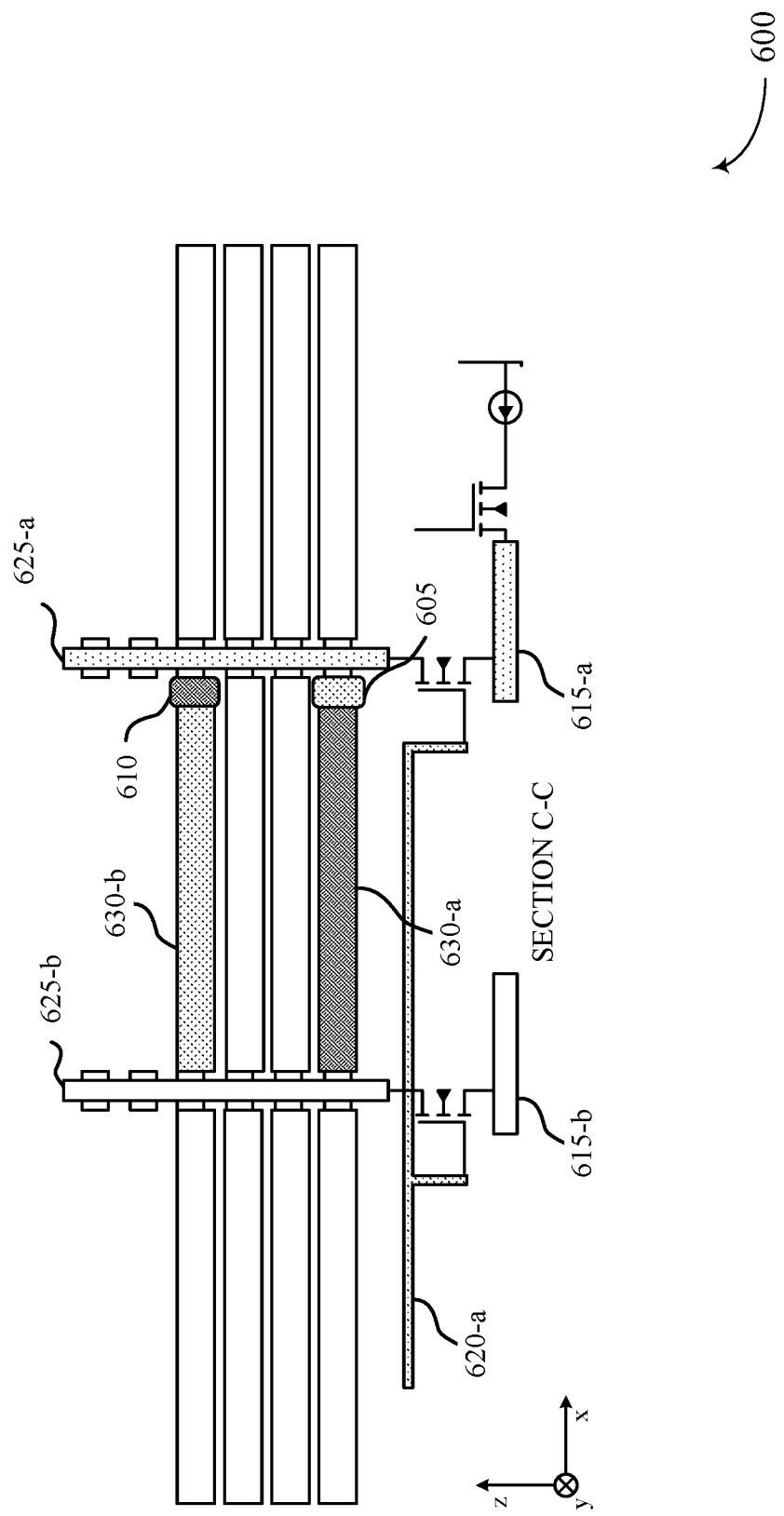
FIG. 6 illustrates an example of a vertical memory architecture that supports memory array seasoning in accordance with examples as disclosed herein.

FIG. 6 illustrates an example of a vertical memory architecture 600 that supports memory array seasoning in accordance with examples as disclosed herein. FIG. 6 illustrates a side section view (e.g., SECTION C-C) of the memory array 200 as described with reference to FIG. 2.

FIG. 6 may illustrate an example of a vertical memory architecture 600, which may be an example of a memory array 200 as described with reference to FIG. 2, in which the word lines 630 may be distributed along the z-direction according to different levels (e.g., decks, layers, planes, tiers). Additionally or alternatively, each pillar 625 may be coupled with a respective set of memory cells 105 (e.g., along the z-direction, one or more memory cells 105 for each level). In some examples, a TFT may be coupled with the bottom of the pillars 625 and may be driven by a dedicated gate line 620. The memory array may include one or more target cells and one or more helper cells as described herein. The target cell 605 may be coupled with a word line 630-*a* of a first tier and the helper cell 610 may be coupled with a word line 630-*b* of a second tier (e.g., a different tier) of the memory array.

A seasoning operation may be performed on the target cell 605 by first selecting the gate line 620-*a*. In some examples, the helper cell 610 may initially be set to a low threshold voltage such that, when selected during the seasoning operation, the helper cell 610 is activated (e.g., switched on). Next, the target cell 605 may be activated by driving the target word line 630-*a* low and the digit line 615-*a* high (e.g., while a digit line 615-*b* not associated with the target cell 605 may remain low, which may drive pillar 625-*b* low). Both the target word line 630-*a* and the digit line 615-*a* may be driven with voltage sources of equal and opposite magnitude (e.g., the word line 630-*a* may be driven at −E4/2V and the digit line 615-*a* may be driven at E4/2V) although, in some examples, the target word line 630-*a* and the digit line 615-*a* may be driven to different voltages. In some cases, the driver of the digit line 615-*a* may limit the current of the digit line 615-a with a current clamp (e.g., ~$I_{Hold}$) which may result in limited current being driven through the word line 630-a.

Accordingly, when the target cell 605 turns on, the target cell 605 may draw the voltage of the pillar 625-a low to a level capable of activating the helper cell 610. For example, the voltage of pillar 625-a may be determined as ~-E4/2+$V_{Hold}$=(-3.5+2.5)=-1V. One or more drivers associated with the memory array 200 may then activate the helper cell 610 by driving the helper word line 630-b high. Once the helper cell 610 has been activated, the current clamp may be removed from the digit line 615-a, resulting in higher current, based on the word line and digit line drivers, to flow on the digit line 615-a and the word line 630-b. Accordingly, the seasoning operation performed on the target cell 605 may effectively lower its threshold voltage. By lowering the target cell's threshold voltage, the drivers associated with the memory array 200 may provide an adequate drive strength to reliably access the memory cells.

Figures 7A, 7B, 7C:
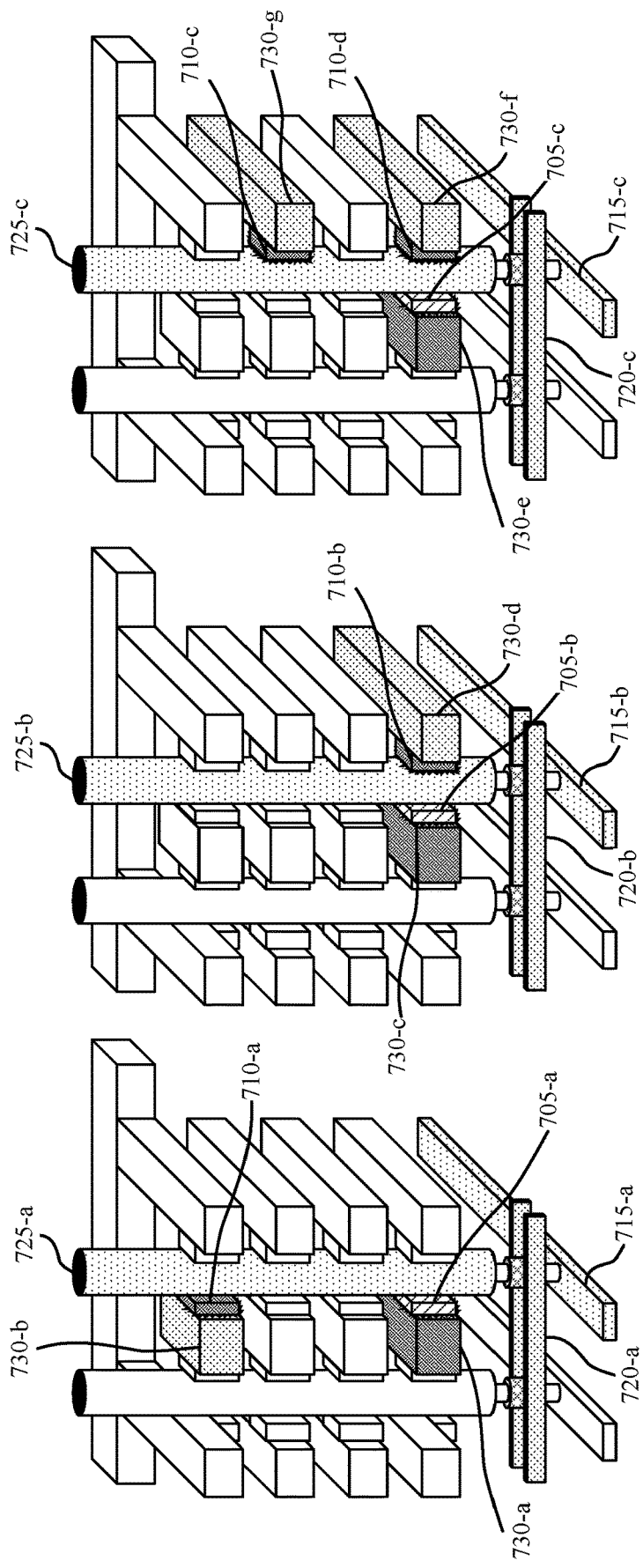
FIGS. 7A, 7B, and 7C illustrate examples of vertical memory configurations that support memory array seasoning in accordance with examples as disclosed herein.

FIGS. 7A, 7B, and 7C illustrate various examples of helper cells in a vertically accessed 3D memory configuration that supports memory array seasoning in accordance with examples as disclosed herein. The memory array 700 shown in FIGS. 7A, 7B, and 7C may be an example of memory array 200.

In FIG. 7A, a top tier of the memory array 200 may be utilized as a dummy tier. Accordingly, some or all memory cells included in the top tier may function as helper cells and each helper cell of the dummy tier may be used to season one or more target cells that share a same pillar. The memory cells included in the dummy tier may be referred to as dummy cells because they may not be utilized for storing data received from a host device. For example, a helper cell 710-a may be coupled with a word line 730-b associated with the first tier of the memory array 200. A target cell 705-a may be located on a different tier (e.g., a tier above or below the dummy tier) and may be coupled with a same conductive pillar 725-a as the helper cell 710-a.

In some examples, a seasoning operation may be performed by selecting the gate line 720-a (e.g., by driving the gate line 720-a to a voltage). After driving the gate line 720-a, the target word line 730-a may be driven to a relatively low voltage and the digit line 715-a may be driven to a relatively high voltage. The helper word line 730-b may then be driven to a relatively high voltage, which may activate the helper cell 710-a. Upon the helper cell 710-a being activated, additional current may be applied across the target memory cell 705-a, which may effectively lower its threshold voltage.

In FIG. 7B, the helper cell 710-b may be included in a same tier as the target cell 705-b. As such, the word line 730-d may experience a lower voltage drop (e.g., a lower IR-drop), since the distance between the helper driver and the helper cell 710-b may be shorter compared to the case shown in FIG. 7A. In the case shown in FIG. 7B, the target cell 705-b may be positioned on an even word line 730-c while the helper cell 710-b may be positioned on an odd word line 730-d. In some examples, the helper cell 710-b may be programmed to a relatively low voltage prior to a seasoning operation so that the helper cell 710-b may be activated by applying a positive voltage differential between the odd word line 730-d and the pillar 725-b.

In some examples, a seasoning operation may be performed by selecting the gate line 720-b (e.g., by driving the gate line 720-b to a voltage). After driving the gate line 720-b, the target word line 730-c may be driven to a relatively low voltage and the digit line 715-b may be driven to a relatively high voltage. The helper word line 730-c may then be driven to a relatively high voltage, which may activate the helper cell 710-b. Upon the helper cell 710-b being activated, additional current may be applied across the target memory cell 705-b, which may effectively lower its threshold voltage.

In FIG. 7C, multiple helper cells (e.g., helper cells 710-c and 710-d) may be used during a seasoning operation. The helper cells 710-c and 710-d may be positioned on the odd word lines 730-f and 730-g of the pillar 725-c. In some examples, a seasoning operation may be performed by selecting the gate line 720-c (e.g., by driving the gate line 720-c to a voltage). After driving the gate line 720-c, the target word line 730-e may be driven to a relatively low voltage and the digit line 715-c may be driven to a relatively high voltage.

The helper word lines 730-f and 730-g may then be driven to a relatively high voltage, which may activate the helper cells 710-c and 710-d. Upon the helper cells 710-c and 710-d being activated, additional current may be applied across the target memory cell 705-c, which may effectively lower its threshold voltage. Although FIG. 7C may illustrate two active helper word lines, additional odd word lines may also be activated. Similarly, additional helper cells on an odd word line may likewise be activated depending on the resistivity of the respective word line. Additionally or alternatively, multiple target cells may be seasoned at a time. The quantity of target cells that may be seasoned together may be limited by the resistance of the word lines and digit lines.

Figure 8:
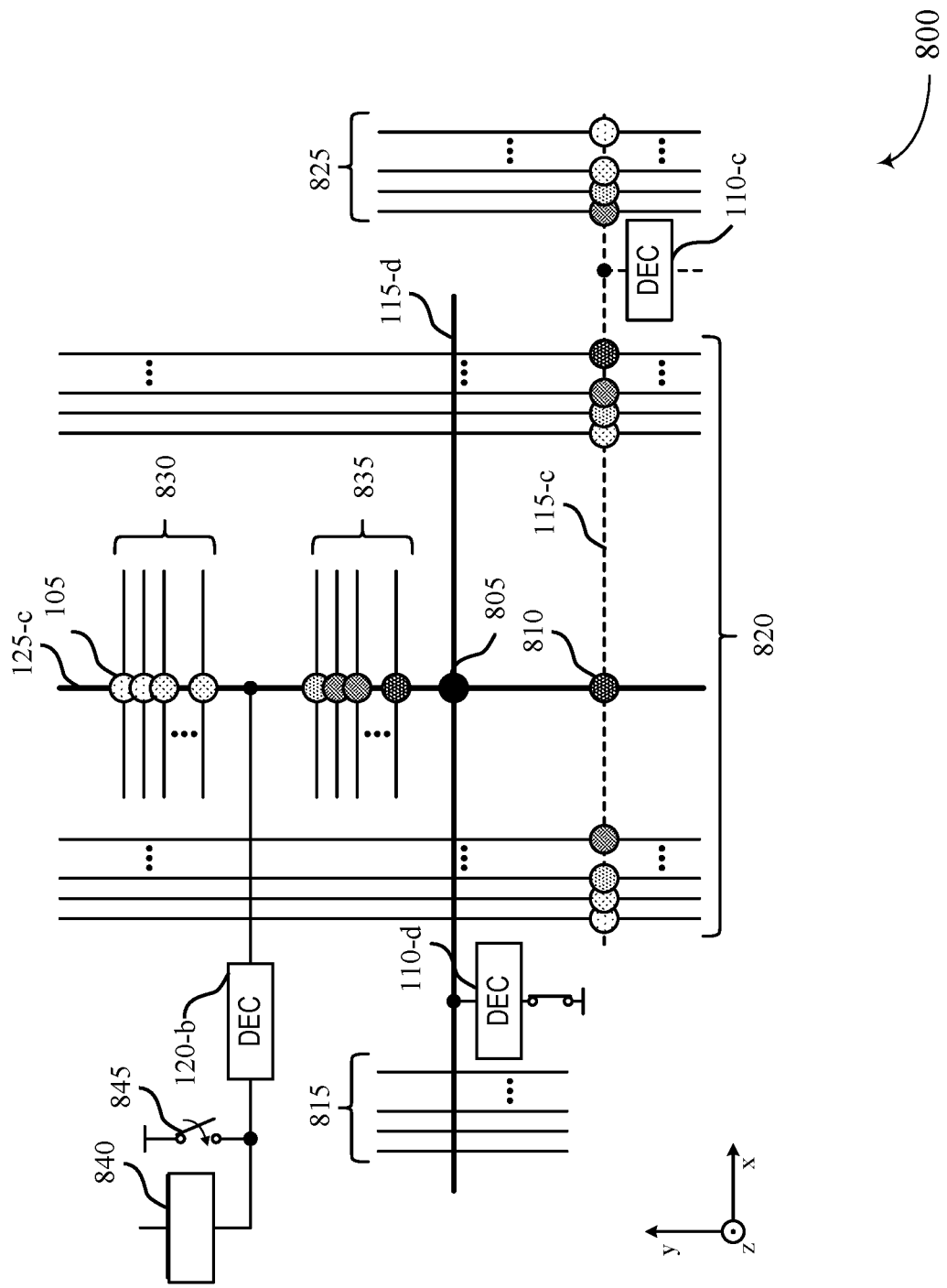
FIG. 8 illustrates an example of a helper cell placement in a memory configuration that supports memory array seasoning in accordance with examples as disclosed herein.

FIG. 8 illustrates an example of a two dimensional memory array 800 that supports memory array seasoning in accordance with examples as disclosed herein. The memory array 800 may be an illustration of a two dimensional memory array that may be stacked with alternating row and bit lines to form a three dimensional architecture (e.g., a three dimensional cross-point architecture). The memory array 800 may include word line groups 830 and 835 and word line 115-d, and bit line groups 815, 820, 825 and bit line 125-c which may be examples of row lines 115 and column lines 125, respectively, as described in FIG. 1. The memory cells 105 may be examples of memory cells 105 as described in FIG. 1.

The word lines and bit lines may alternate between decks of memory cells 105 in a 2D architecture such that a row decoder 110 may select a word line and a column decoder 120 may select a bit line to activate a memory cell 10 at the intersection of the word line and bit line. For example, a bit line 125-c may intersect each word line of the memory array 800 as illustrated by the intersection with the word line groups 830 and the word line groups 835. The word line groups 830 and 835 may collectively represent each word line of the memory array 800. Similarly, a word line 115-d may intersect each bit line of the memory array 800 as illustrated by the intersection with the bit line groups 815, 820, and 825. The bit line groups 815, 820, and 825 may collectively represent each bit line of the memory array 800.

The decoders of the memory array 800 may select respective access lines such that a memory cell 105 at the intersection of selected access lines is activated. For example, the decoder 120-b may be associated with bit line 125-c and the decoder 110-d may be associated with word line 115-d. Accordingly, the decoder 120-b and may select the bit line 125-c and the decoder 110-d may select the word line 115-d to activate the target cell 805. Additionally or alternatively, the decoder 120-b may select the bit line 125-a and a different decoder associated with a word line of the word line groups 830 or 835 may select a different word line to activate a different cell 105 along the bit line 125-c.

In some cases, the target cell 805 may have a relatively high voltage threshold due to it being exposed to a high thermal environment during fabrication. Accordingly, without seasoning the target cell 805, the drivers of the memory array 800 may be unable to drive the respective access lines to a high enough voltage to activate the cell. As such, performing a seasoning operation on the target cell 805 may generate a relatively high current to flow through the target cell 805 which may configure the target cell 805 with a lower threshold such that it may be activated during normal access operations.

In some cases, the helper cell 810 may be located on a designated helper word line 115-c where each cell 105 on the word line 115-c may be a helper cell for a target cell associated with a shared bit line. For example, the bit lines represented in bit line groups 820 and 825 may intersect with the helper word line 115-c. Accordingly, each helper cell at the intersection of word line 115-c and one of the bit lines of bit line group 820 or 825 may be utilized during a seasoning operation for a target cell associated with the same, shared bit line. Thus, while the helper cell 810 may be used during a seasoning operation for the target cell 805, the helper cell 810 may additionally or alternatively be used during a seasoning operation of any memory cell 105 associated with the bit line 125-c.

In some examples, the memory array 800 may include a dedicated decoder 110-c for selecting the helper word line 115-c for a seasoning operation. Because the decoder 110-c may be used to select a single word line 115-c that is not be used in normal memory operations (e.g., that is not used to read data from or write data to a memory cell), the decoder 110-c may provide a positive voltage to switch on the helper cell 810. Additionally, the word line 115-c may have a relatively lower resistance than other word lines in the memory array 800 in order to reduce the voltage drop across the word line 115-c. Accordingly, a higher strength driver may reduce the voltage drop across the decoder 110-c. Thus, the dedicated word line 115-c may provide for voltage and current levels for activating the helper cell 810 to perform a seasoning operation on the target cell 805. In some cases, a current clamp 840 may be used to initially limit the current sourced by decoder 120-b to allow the bit line 125-c to drop to help switch the helper cell 810 on. Subsequently, the current claim 840 may be bypassed by current bypass 845, which may allow additional current to flow through decoder 120-b for the seasoning operation.

Figure 9:
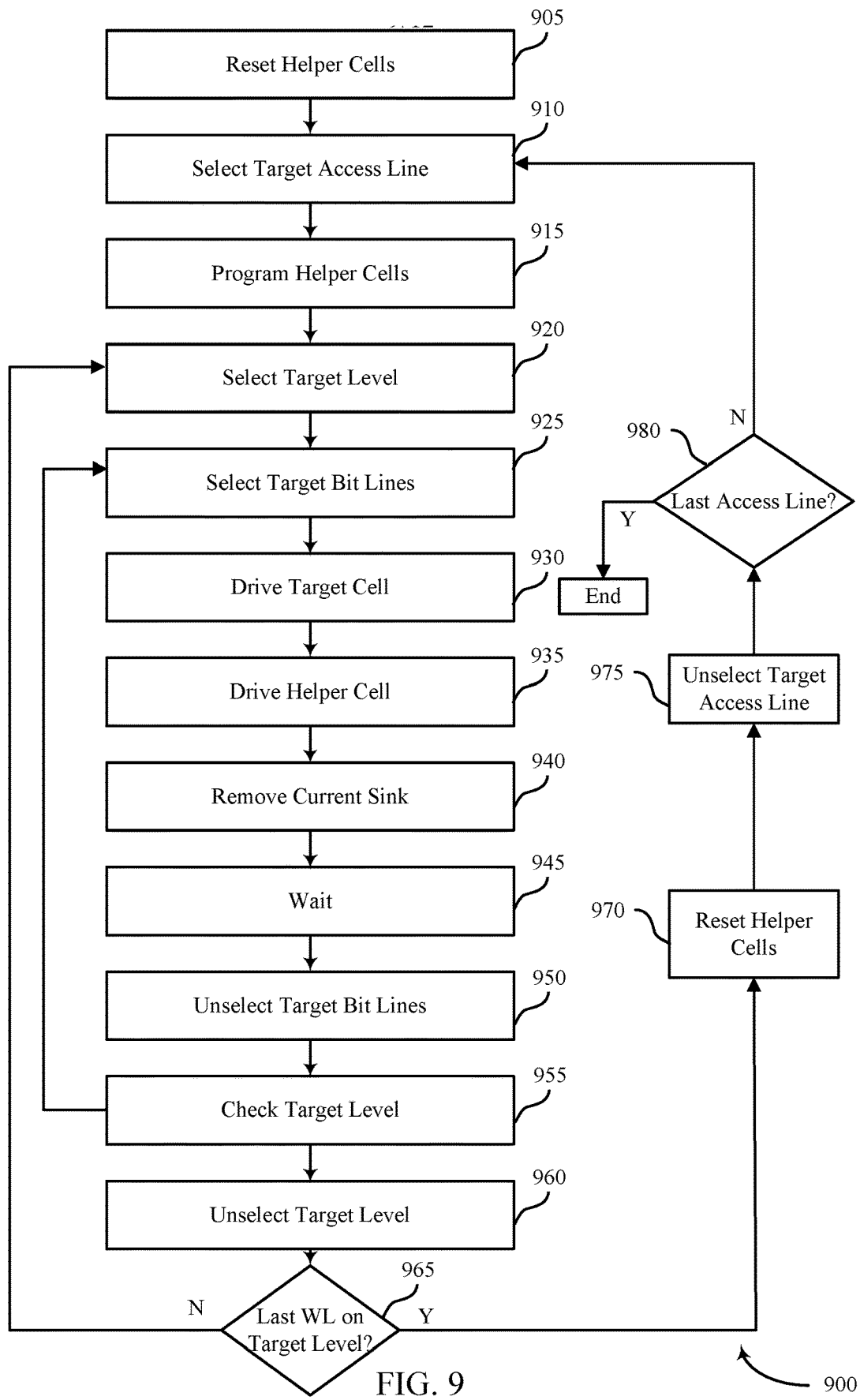
FIG. 9 illustrates an example of a process flow diagram that supports memory array seasoning in accordance with examples as disclosed herein.

FIG. 9 illustrates an example of a process flow diagram 900 that supports memory array seasoning in accordance with examples as disclosed herein. In some cases, the process flow diagram 900 may depict the steps for a seasoning operation that is performed on a three dimensional memory array, such as the memory array 700, or a two dimensional memory array, such as the memory array 800. As described herein, performing a seasoning operation on a target cell may lower its threshold voltage, which may allow for the associated array's drivers to provide an adequate drive strength to reliably access the memory cells.

At 905, one or more helper cells of a memory array may be set to an initial threshold voltage (e.g., one or more memory cells may be reset). Resetting the helper cells may include activating one or more drivers to program the helper cells. In some examples, resetting the helper cells may include programming the helper cells to a relatively high threshold voltage or programming the helper cells with a same polarity such that the cell(s) may activate (e.g., snap, threshold) when the same polarity is applied again. Such programming may prevent the helper cells from being activated inadvertently during normal memory operations. In some cases, the helper cells may be connected to a dedicated helper word line of the memory array. In other cases, the helper cells may be associated with a dedicated deck or dedicated tier of helper memory cells. Accordingly, at 905, a word line associated with the helper cells may be activated.

At 910, a decoder of the memory array may select a gate line coupled with the target cell. At 915, one or more drivers may program the helper cell by driving the bit lines to activate the helper cell such that the threshold voltage of the helper cell may be set to the initial threshold voltage.

At 920, a decoder of the memory array may select a level of the memory array associated with the target cell. In some cases, a decoder may select the word line of the target cell corresponding to a deck of the memory array. In other cases, a row decoder may select the word line of the target cell corresponding to a tier of the memory array. In some examples, at 920, a current limit (e.g., clamp) may be applied on the bit line to allow the bit line to be pulled down by the target cell when the target cell is accessed, which may facilitate the helper cell to switch on.

At 925, a decoder of the memory array may select a set of bit lines (e.g., a set of digit lines) of the memory array associated with the target cell. At 930, the access lines associated with the target cell may be driven to respective voltages to select the target cell. For example, a word line driver may drive the target word line low and a digit line driver may drive the target digit line high, which may select the target cell.

At 935, the helper word line driver may drive the helper word line to activate the helper cell. In some implementations, the current limit may be removed or deactivated at 940. In some cases, removing the current limit may include removing the current limit associated with the target digit line. In other cases, removing the current limit may include removing the current limit associated with the target bit line.

At 945, the drivers may remain driving the target and helper word lines, as well as the target bit line for a duration during which increased levels of current may flow across the target cell. As described herein, this operation may effectively lower the threshold voltage of the target cell.

At 950, a row decoder may unselect the set of target bit lines (e.g., the set of target digit lines). At 955, a controller or other testing component may determine if any other memory cells coupled with the target word line have an undesirably high threshold voltage. If there are still memory cells on the target word line to be seasoned then the process flow begins again at 925. However, at 960, if no such cells exist, a column decoder may unselect the target word line.

At 965, a controller or other testing component may determine if the current word line is the last word line on the deck or tier of the memory array. If it is determined that the current word line is the last word line on the deck or tier, then at 970 the associated helper cells may be reset. Moreover, at 975 a decoder may unselect the target gate line, and at 980 a testing component may determine whether there are still unseasoned memory cells on another gate line of the memory array. If there are still remaining gate lines, the process flow may continue at 910 on the next gate line. However, at 980, if it is determined that the current gate line is the last gate line of the deck or tier the process may end. At 965, if additional word lines on the deck have not undergone a seasoning operation, the process flow may begin again at step 920 with respect to the word lines that have not undergone a seasoning operation.

Figure 10:
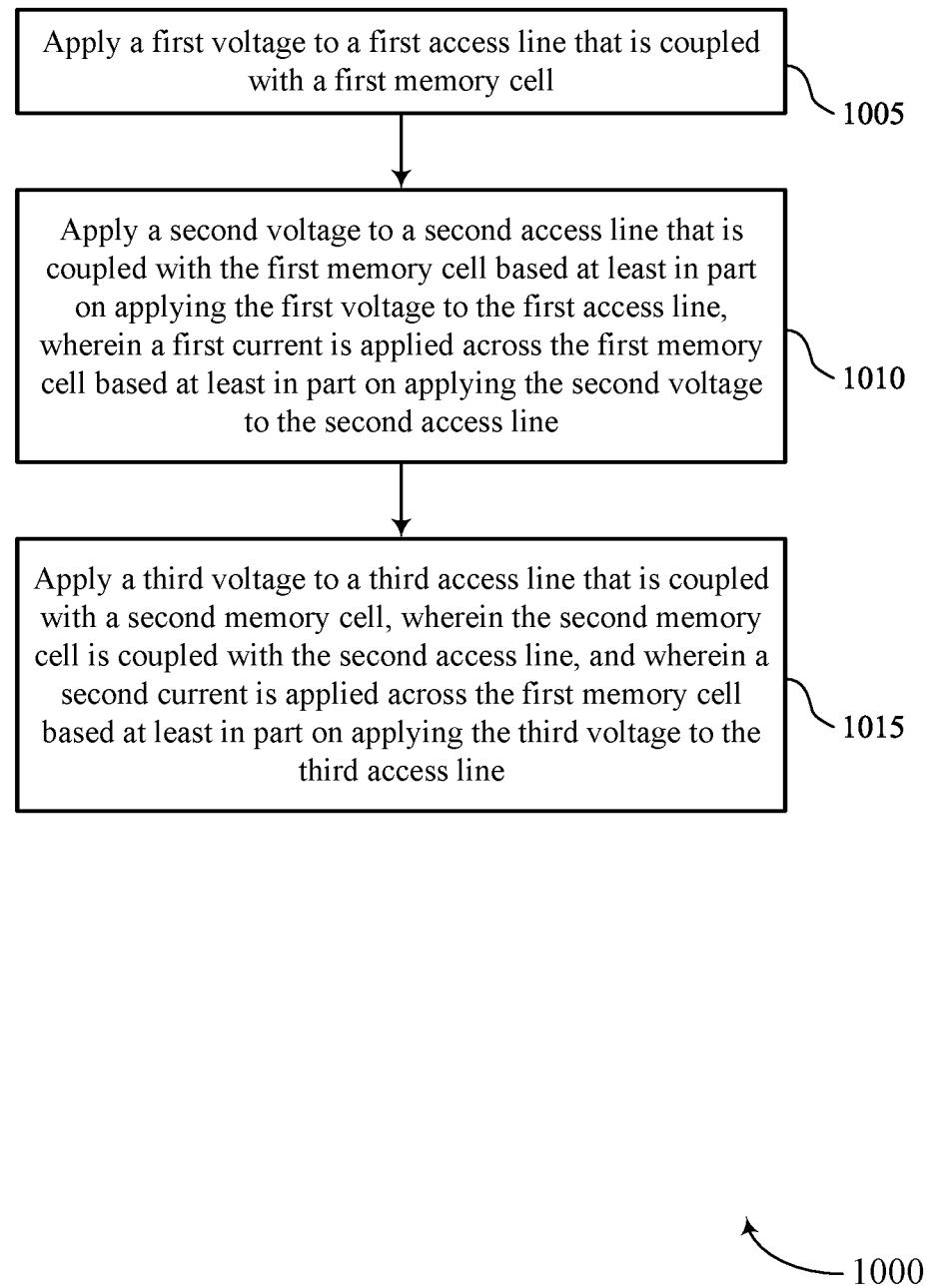
FIGS. 10 through 12 show flowcharts illustrating a method or methods that support memory array seasoning in accordance with examples as disclosed herein.

FIG. 10 shows a flowchart illustrating a method 1000 that supports memory array seasoning in accordance with examples as disclosed herein. The operations of method 1000 may be implemented by testing equipment or a controller, such as a memory device controller as described herein. In some examples, the testing equipment or controller may execute a set of instructions to control the functional elements of the device to perform the described functions. Additionally, or alternatively, the testing equipment or controller may perform aspects of the described functions using special-purpose hardware.

At 1005, the method may include applying a first voltage to a first access line that is coupled with a first memory cell. The operations of 1005 may be performed in accordance with examples as disclosed herein. In some examples, aspects of the operations of 1005 may be performed by testing equipment or a controller, such as a memory device controller as described herein.

At 1010, the method may include applying a second voltage to a second access line that is coupled with the first memory cell based at least in part on applying the first voltage to the first access line, where a first current is applied across the first memory cell based at least in part on applying the second voltage to the second access line. The operations of 1010 may be performed in accordance with examples as disclosed herein. In some examples, aspects of the operations of 1010 may be performed by testing equipment or a controller, such as a memory device controller as described herein.

At 1015, the method may include applying a third voltage to a third access line that is coupled with a second memory cell, where the second memory cell is coupled with the second access line, and where a second current is applied across the first memory cell based at least in part on applying the third voltage to the third access line. The operations of 1015 may be performed in accordance with examples as disclosed herein. In some examples, aspects of the operations of 1015 may be performed by testing equipment or a controller, such as a memory device controller as described herein.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for applying a first voltage to a first access line that is coupled with a first memory cell; applying a second voltage to a second access line that is coupled with the first memory cell based at least in part on applying the first voltage to the first access line, where a first current is applied across the first memory cell based at least in part on applying the second voltage to the second access line; and applying a third voltage to a third access line that is coupled with a second memory cell, where the second memory cell is coupled with the second access line, and where a second current is applied across the first memory cell based at least in part on applying the third voltage to the third access line.

Aspect 2: The method, apparatus, or non-transitory computer-readable medium of aspect 1, further including operations, features, circuitry, logic, means, or instructions, or any combination thereof for programming the second memory cell to a first logic state before applying the first voltage to the first access line, where the first memory cell is programmed to a second logic state different than the first logic state.

Aspect 3: The method, apparatus, or non-transitory computer-readable medium of any of aspects 1 through 2 where the first memory cell is located in a first tier of a memory array including a first plurality of memory cells; and the second memory cell is located in a second tier of the memory array including a second plurality of memory cells.

Aspect 4: The method, apparatus, or non-transitory computer-readable medium of aspect 3 where the second plurality of memory cells include dummy memory cells that are not utilized for storing data received from a host device.

Aspect 5: The method, apparatus, or non-transitory computer-readable medium of any of aspects 1 through 4 where the first memory cell is located in a first tier of a memory array including a first plurality of memory cells; and the second memory cell is located in the first tier of the memory array.

Aspect 6: The method, apparatus, or non-transitory computer-readable medium of any of aspects 1 through 5, further including operations, features, circuitry, logic, means, or instructions, or any combination thereof for applying the third voltage to a fourth access line that is coupled with a third memory cell, where the third memory cell is coupled with the second access line, and where a third current is applied across the first memory cell based at least in part on applying the third voltage to the fourth access line.

Aspect 7: The method, apparatus, or non-transitory computer-readable medium of aspect 6, further including operations, features, circuitry, logic, means, or instructions, or any combination thereof for the first memory cell is located in a first tier of a memory array including a first plurality of memory cells; the second memory cell is located in the first tier of the memory array or a second tier of the memory array including a second plurality of memory cells; and the third memory cell is located in the first tier of the memory array, the second tier of the memory array, or a third tier of the memory array including a third plurality of memory cells.

Aspect 8: The method, apparatus, or non-transitory computer-readable medium of any of aspects 1 through 7 where the second access line is coupled with a conductive pillar extending through a plurality of tiers of a memory array and the first memory cell and the second memory cell are coupled with the conductive pillar.

Aspect 9: The method, apparatus, or non-transitory computer-readable medium of aspect 8, further including operations, features, circuitry, logic, means, or instructions, or any combination thereof for applying a fourth voltage to a fifth access line associated with the conductive pillar before applying the first voltage to the first access line, where the second voltage is applied to the second access line according to a first current drive prior to applying the third voltage to the third access line.

Aspect 10: The method, apparatus, or non-transitory computer-readable medium of aspect 9, further including operations, features, circuitry, logic, means, or instructions, or any combination thereof for applying the fourth voltage to the fifth access line according to a second current drive based at least in part on applying the third voltage to the third access line, where the second current is applied across the first memory cell based at least in part on applying the fourth voltage to the fifth access line according to the second current drive.

Aspect 11: The method, apparatus, or non-transitory computer-readable medium of any of aspects 1 through 10 where the first access line includes a word line; the third access line includes a dummy word line; and the first memory cell and the second memory cell are located in a first deck of a memory array that includes a plurality of memory cells.

Aspect 12: The method, apparatus, or non-transitory computer-readable medium of aspect 11 where the word line is coupled with a first driver and the dummy word line is coupled with a second driver different than the first driver and the first driver includes a first drive strength and the second driver includes a second drive strength that is greater than the first drive strength.

Aspect 13: The method, apparatus, or non-transitory computer-readable medium of any of aspects 1 through 12 where the first voltage includes a first polarity and the second voltage and the third voltage include a second polarity that is different than the first polarity.

Aspect 14: The method, apparatus, or non-transitory computer-readable medium of any of aspects 1 through 13 where a threshold voltage of the first memory cell is altered based at least in part on the second current associated with the third voltage being applied across the first memory cell for a duration.

Figure 11:
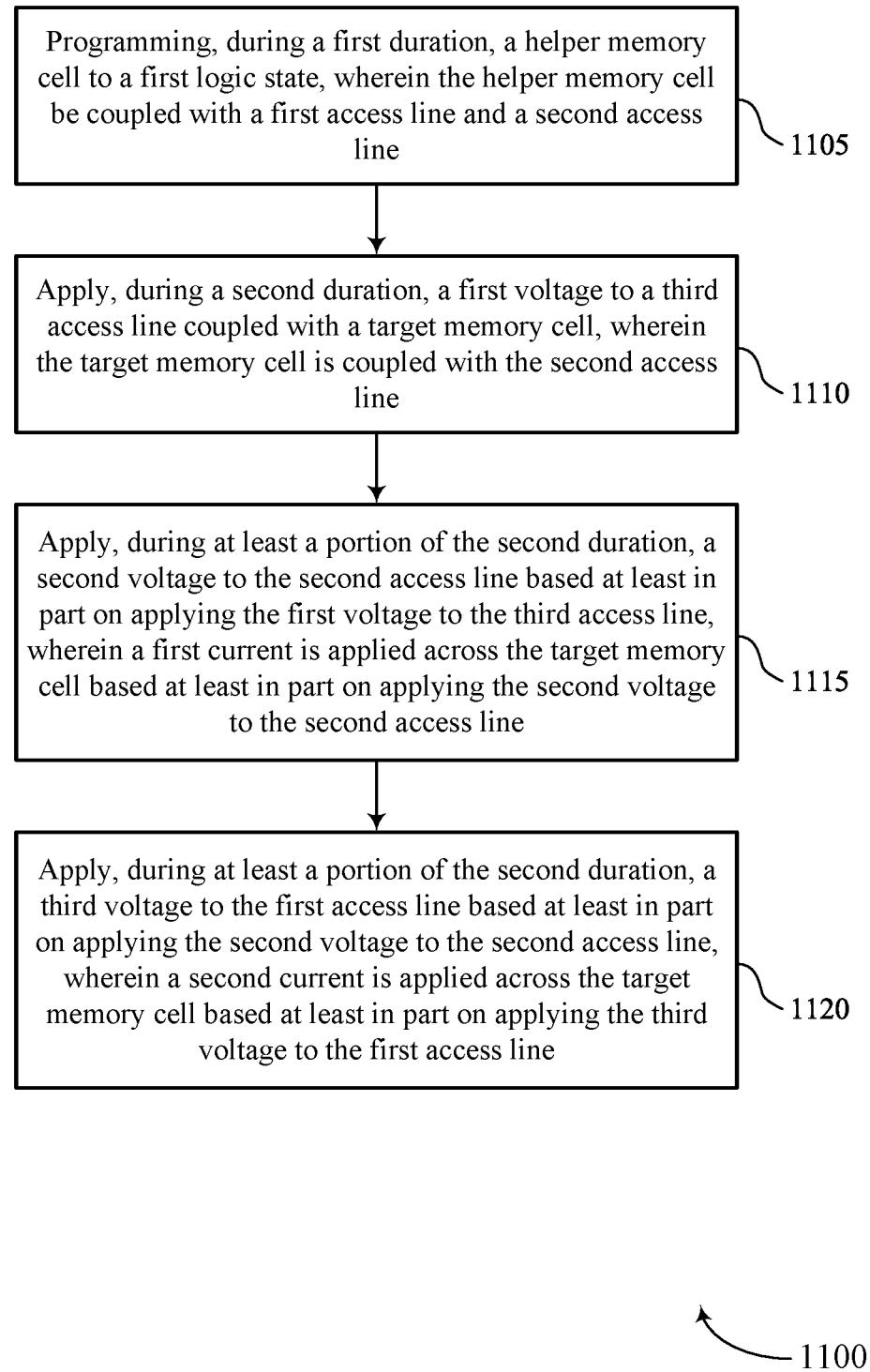

FIG. 11 shows a flowchart illustrating a method 1100 that supports memory array seasoning in accordance with examples as disclosed herein. The operations of method 1100 may be implemented by testing equipment or a controller, such as a memory device controller as described herein. For example, the operations of method 1100 may be performed by testing equipment or a controller, such as a memory device controller as described herein. In some examples, testing equipment or controller may execute a set of instructions to control the functional elements of the device to perform the described functions. Additionally, or alternatively, the testing equipment or controller may perform aspects of the described functions using special-purpose hardware.

At 1105, the method may include programming, during a first duration, a helper memory cell to a first logic state, where the helper memory cell is coupled with a first access line and a second access line. The operations of 1105 may be performed in accordance with examples as disclosed herein. In some examples, aspects of the operations of 1105 may be performed by testing equipment or a controller, such as a memory device controller as described herein.

At 1110, the method may include applying, during a second duration, a first voltage to a third access line coupled with a target memory cell, where the target memory cell is coupled with the second access line. The operations of 1110 may be performed in accordance with examples as disclosed herein. In some examples, aspects of the operations of 1110 may be performed by testing equipment or a controller, such as a memory device controller as described herein.

At 1115, the method may include applying, during at least a portion of the second duration, a second voltage to the second access line based at least in part on applying the first voltage to the third access line, where a first current is applied across the target memory cell based at least in part on applying the second voltage to the second access line. The operations of 1115 may be performed in accordance with examples as disclosed herein. In some examples, aspects of the operations of 1115 may be performed by testing equipment or a controller, such as a memory device controller as described herein.

At 1120, the method may include applying, during at least a portion of the second duration, a third voltage to the first access line based at least in part on applying the second voltage to the second access line, where a second current is applied across the target memory cell based at least in part on applying the third voltage to the first access line. The operations of 1120 may be performed in accordance with examples as disclosed herein. In some examples, aspects of the operations of 1120 may be performed by testing equipment or a controller, such as a memory device controller as described herein.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for programming, during a first duration, a helper memory cell to a first logic state, where the helper memory cell is coupled with a first access line and a second access line; applying, during a second duration, a first voltage to a third access line coupled with a target memory cell, where the target memory cell is coupled with the second access line; applying, during at least a portion of the second duration, a second voltage to the second access line based at least in part on applying the first voltage to the third access line, where a first current is applied across the target memory cell based at least in part on applying the second voltage to the second access line; and applying, during at least a portion of the second duration, a third voltage to the first access line based at least in part on applying the second voltage to the second access line, where a second current is applied across the target memory cell based at least in part on applying the third voltage to the first access line.

Aspect 16: The method, apparatus, or non-transitory computer-readable medium of aspect 15, further including operations, features, circuitry, logic, means, or instructions, or any combination thereof for programming, during the first duration, a second helper memory cell to the first logic state, where the second helper memory cell is coupled with the second access line and a fourth access line and applying, during at least a portion of the second duration, the third voltage to the fourth access line based at least in part on programming the second helper memory cell to the first logic state, where a third current is applied across the target memory cell based at least in part on applying the third voltage to the fourth access line.

Aspect 17: The method, apparatus, or non-transitory computer-readable medium of any of aspects 15 through 16 where the target memory cell is located in a first tier of a memory array including a first plurality of memory cells; the helper memory cell is located in a second tier of the memory array including a second plurality of memory cells; and the second plurality of memory cells are not addressable by a host device.

Aspect 18: The method, apparatus, or non-transitory computer-readable medium of any of aspects 15 through 17 where the first access line and the third access line are coplanar.

Aspect 19: The method, apparatus, or non-transitory computer-readable medium of any of aspects 15 through 18 where prior to programming the helper memory cell to the first logic state, the target memory cell includes a first threshold voltage and the target memory cell includes a second threshold voltage different than the first threshold voltage based at least in part on the second current associated with the third voltage being applied across the target memory cell.

Aspect 20: The method, apparatus, or non-transitory computer-readable medium of any of aspects 15 through 19 where the target memory cell includes a second logic state different than the first logic state during at least the first duration.

Aspect 21: The method, apparatus, or non-transitory computer-readable medium of any of aspects 15 through 20 where the second access line is coupled with a conductive pillar extending through a plurality of tiers of a memory array and the target memory cell and the helper memory cell are coupled with the conductive pillar.

Aspect 22: The method, apparatus, or non-transitory computer-readable medium of any of aspects 15 through 21 where the first access line includes a word line; the second access line includes a digit line; the third access line includes a dummy word line; and the target memory cell and the helper memory cell are located in a first deck of a memory array that includes a plurality of memory cells.

Figure 12:
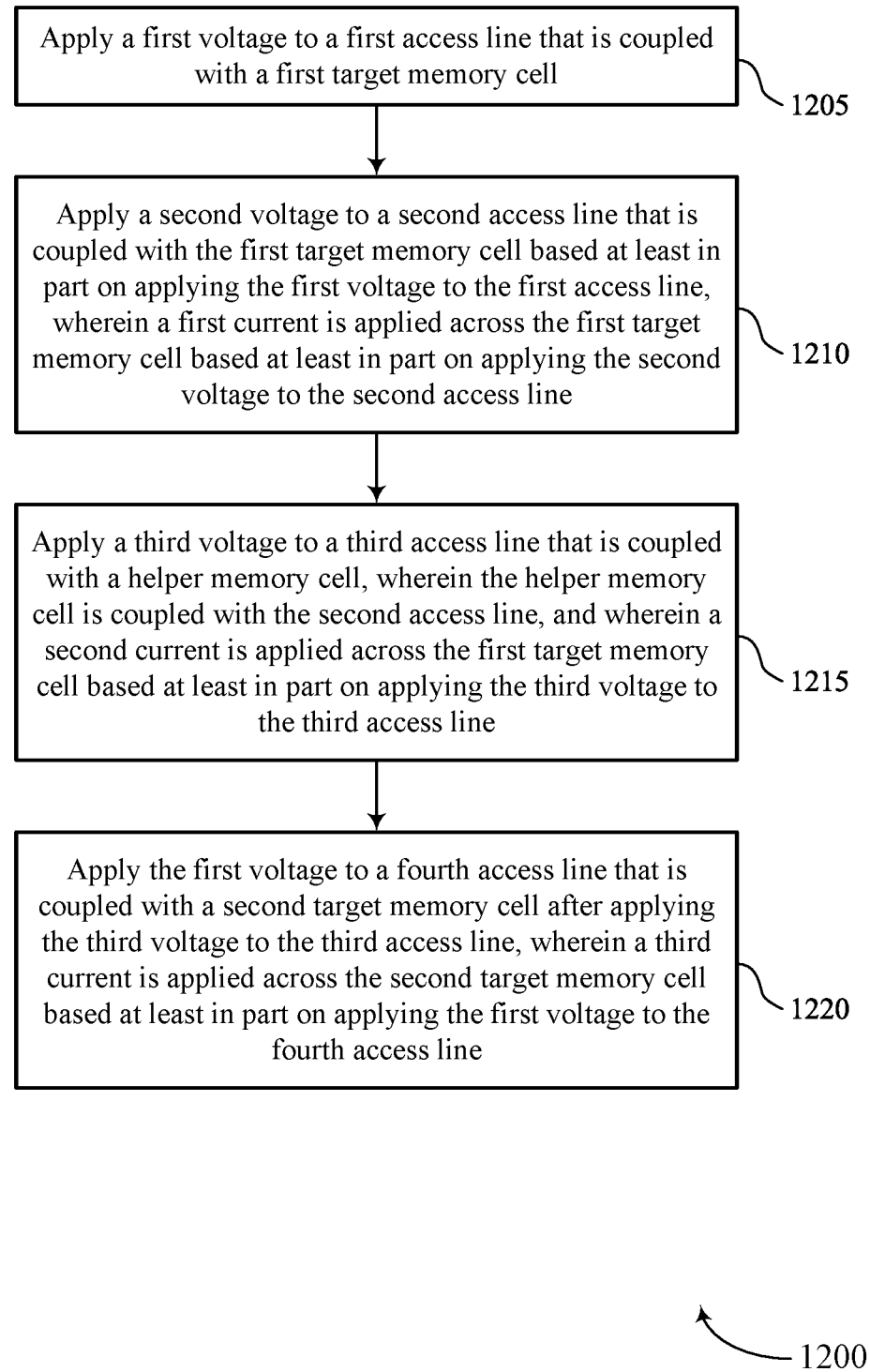

FIG. 12 shows a flowchart illustrating a method 1200 that supports memory array seasoning in accordance with examples as disclosed herein. The operations of method 1200 may be implemented by testing equipment or a controller, such as a memory device controller as described herein. For example, the operations of method 1200 may be performed by testing equipment or a controller, such as a memory device controller as described herein. In some examples, the testing equipment or controller may execute a set of instructions to control the functional elements of the device to perform the described functions. Additionally, or alternatively, the testing equipment or controller may perform aspects of the described functions using special-purpose hardware.

At 1205, the method may include applying a first voltage to a first access line that is coupled with a first target memory cell. The operations of 1205 may be performed in accordance with examples as disclosed herein. In some examples, aspects of the operations of 1205 may be performed testing equipment or a controller, such as a memory device controller as described herein.

At 1210, the method may include applying a second voltage to a second access line that is coupled with the first target memory cell based at least in part on applying the first voltage to the first access line, where a first current is applied across the first target memory cell based at least in part on applying the second voltage to the second access line. The operations of 1210 may be performed in accordance with examples as disclosed herein. In some examples, aspects of the operations of 1210 may be performed by testing equipment or a controller, such as a memory device controller as described herein.

At 1215, the method may include applying a third voltage to a third access line that is coupled with a helper memory cell, where the helper memory cell is coupled with the second access line, and where a second current is applied across the first target memory cell based at least in part on applying the third voltage to the third access line. The operations of 1215 may be performed in accordance with examples as disclosed herein. In some examples, aspects of the operations of 1215 may be performed by testing equipment or a controller, such as a memory device controller as described herein.

At 1220, the method may include applying the first voltage to a fourth access line that is coupled with a second target memory cell after applying the third voltage to the third access line, where a third current is applied across the second target memory cell based at least in part on applying the first voltage to the fourth access line. The operations of 1220 may be performed in accordance with examples as disclosed herein. In some examples, aspects of the operations of 1220 may be performed by testing equipment or a controller, such as a memory device controller as described herein.

In some examples, an apparatus as described herein may perform a method or methods, such as the method 1200. The apparatus may include features, circuitry, logic, means, or instructions (e.g., a non-transitory computer-readable medium storing instructions executable by a processor), or any combination thereof for performing the following aspects of the present disclosure:

Aspect 23: A method, apparatus, or non-transitory computer-readable medium including operations, features, circuitry, logic, means, or instructions, or any combination thereof for applying a first voltage to a first access line that is coupled with a first target memory cell; applying a second voltage to a second access line that is coupled with the first target memory cell based at least in part on applying the first voltage to the first access line, where a first current is applied across the first target memory cell based at least in part on applying the second voltage to the second access line; applying a third voltage to a third access line that is coupled with a helper memory cell, where the helper memory cell is coupled with the second access line, and where a second current is applied across the first target memory cell based at least in part on applying the third voltage to the third access line; and applying the first voltage to a fourth access line that is coupled with a second target memory cell after applying the third voltage to the third access line, where a third current is applied across the second target memory cell based at least in part on applying the first voltage to the fourth access line.

Aspect 24: The method, apparatus, or non-transitory computer-readable medium of aspect 23 where the first target memory cell is located in a first tier of a memory array including a first plurality of memory cells; the second target memory cell is located in a second tier of the memory array including a second plurality of memory cells; the helper memory cell is located in a third tier of the memory array including a third plurality of memory cells; and the third plurality of memory cells include dummy memory cells that are not utilized for storing data received from a host device.

Aspect 25: The method, apparatus, or non-transitory computer-readable medium of any of aspects 23 through 24 where the first access line includes a first word line; the third access line includes a dummy word line; the fourth access line includes a second word line; the first target memory cell is located in a first deck of memory cells of a memory array that includes a plurality of memory cells; and the second target memory cell is located in a second deck of memory cells of the memory array.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three-dimensional structure where two dimensions are greater than a third, e.g., a thin-film. Layers or levels may include different elements, components, or materials. In some examples, one layer or level may be composed of two or more sublayers or sublevels.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   programming a second memory cell to a first logic state;
   applying a first voltage to a first access line that is coupled with a first memory cell, wherein the first memory cell is programmed to a second logic state different than the first logic state;
   applying a second voltage to a second access line that is coupled with the first memory cell based at least in part on applying the first voltage to the first access line, wherein a first current is applied across the first memory cell based at least in part on applying the second voltage to the second access line; and
   applying a third voltage to a third access line that is coupled with the second memory cell, wherein the second memory cell is coupled with the second access line, and wherein a second current is applied across the first memory cell based at least in part on applying the third voltage to the third access line.

2. The method of claim 1, wherein:
   the first memory cell is located in a first tier of a memory array comprising a first plurality of memory cells; and
   the second memory cell is located in a second tier of the memory array comprising a second plurality of memory cells.

3. The method of claim 2, wherein:
   the second plurality of memory cells comprise dummy memory cells that are not utilized for storing data received from a host device.

4. A method, comprising:
   applying a first voltage to a first access line that is coupled with a first memory cell;
   applying a second voltage to a second access line that is coupled with the first memory cell based at least in part on applying the first voltage to the first access line, wherein a first current is applied across the first memory cell based at least in part on applying the second voltage to the second access line; and
   applying a third voltage to a third access line that is coupled with a second memory cell, wherein the second memory cell is coupled with the second access line, and wherein a second current is applied across the first memory cell based at least in part on applying the third voltage to the third access line, wherein the first memory cell is located in a first tier of a memory array comprising a first plurality of memory cells, and the second memory cell is located in the first tier of the memory array.

5. The method of claim 1, further comprising:
applying the third voltage to a fourth access line that is coupled with a third memory cell, wherein the third memory cell is coupled with the second access line, and wherein a third current is applied across the first memory cell based at least in part on applying the third voltage to the fourth access line.

6. The method of claim 5, wherein:
the first memory cell is located in a first tier of a memory array comprising a first plurality of memory cells;
the second memory cell is located in the first tier of the memory array or a second tier of the memory array comprising a second plurality of memory cells; and
the third memory cell is located in the first tier of the memory array, the second tier of the memory array, or a third tier of the memory array comprising a third plurality of memory cells.

7. A method, comprising:
applying a first voltage to a first access line that is coupled with a first memory cell;
applying a second voltage to a second access line that is coupled with the first memory cell based at least in part on applying the first voltage to the first access line, wherein a first current is applied across the first memory cell based at least in part on applying the second voltage to the second access line, wherein the second access line is coupled with a conductive pillar extending through a plurality of tiers of a memory array, wherein the first memory cell and a second memory cell are coupled with the conductive pillar; and
applying a third voltage to a third access line that is coupled with the second memory cell, wherein the second memory cell is coupled with the second access line, and wherein a second current is applied across the first memory cell based at least in part on applying the third voltage to the third access line.

8. The method of claim 7, further comprising:
applying a fourth voltage to a fifth access line associated with the conductive pillar before applying the first voltage to the first access line, wherein the second voltage is applied to the second access line according to a first current drive prior to applying the third voltage to the third access line.

9. The method of claim 8, further comprising:
applying the fourth voltage to the fifth access line according to a second current drive based at least in part on applying the third voltage to the third access line, wherein the second current is applied across the first memory cell based at least in part on applying the fourth voltage to the fifth access line according to the second current drive.

10. The method of claim 1, wherein:
the first access line comprises a word line;
the third access line comprises a dummy word line; and
the first memory cell and the second memory cell are located in a first deck of a memory array that comprises a plurality of memory cells.

11. The method of claim 10, wherein the word line is coupled with a first driver and the dummy word line is coupled with a second driver different than the first driver, wherein the first driver comprises a first drive strength and the second driver comprises a second drive strength that is greater than the first drive strength.

12. A method, comprising:
applying a first voltage to a first access line that is coupled with a first memory cell;
applying a second voltage to a second access line that is coupled with the first memory cell based at least in part on applying the first voltage to the first access line, wherein a first current is applied across the first memory cell based at least in part on applying the second voltage to the second access line; and
applying a third voltage to a third access line that is coupled with a second memory cell, wherein the second memory cell is coupled with the second access line, and wherein a second current is applied across the first memory cell based at least in part on applying the third voltage to the third access line, wherein the first voltage comprises a first polarity and the second voltage and the third voltage comprise a second polarity that is different than the first polarity.

13. The method of claim 1, wherein a threshold voltage of the first memory cell is altered based at least in part on the second current associated with the third voltage being applied across the first memory cell for a duration.

* * * * *